(12) United States Patent
Luo et al.

(10) Patent No.: US 11,533,744 B2
(45) Date of Patent: Dec. 20, 2022

(54) RESOURCE SCHEDULING METHOD, TERMINAL DEVICE, AND NETWORK DEVICE

(71) Applicant: Huawei Technologies Co., Ltd., Shenzhen (CN)

(72) Inventors: Zhihu Luo, Beijing (CN); Zhe Jin, Beijing (CN); Xiaolei Tie, Shanghai (CN); Zhe Chen, Shenzhen (CN); Tong Ji, Beijing (CN); Weiliang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 186 days.

(21) Appl. No.: 16/580,911

(22) Filed: Sep. 24, 2019

(65) Prior Publication Data

US 2020/0022173 A1 Jan. 16, 2020

Related U.S. Application Data

(63) Continuation of application No. PCT/CN2017/084222, filed on May 12, 2017.

(30) Foreign Application Priority Data

Mar. 24, 2017 (WO) ................ PCT/CN2017/078201

(51) Int. Cl.
*H04W 72/12* (2009.01)
*H04W 4/80* (2018.01)
(Continued)

(52) U.S. Cl.
CPC ....... *H04W 72/1273* (2013.01); *H04L 1/1819* (2013.01); *H04L 5/0055* (2013.01);
(Continued)

(58) Field of Classification Search
CPC . H04W 72/1273; H04W 72/042; H04W 4/80; H04W 74/0833; H04L 1/1819; H04L 5/0055

See application file for complete search history.

(56) References Cited

U.S. PATENT DOCUMENTS

| 10,721,052 | B2* | 7/2020 | Bhattad | ..................... H04L 1/08 |
| 2010/0142475 | A1* | 6/2010 | Kim | ...................... H04L 5/0053 |
| | | | | 370/329 |

(Continued)

FOREIGN PATENT DOCUMENTS

| CN | 101980575 A | 2/2011 |
| CN | 103782640 A | 5/2014 |

(Continued)

OTHER PUBLICATIONS

"3rd Generation Partnership Project; Technical Specification Group Radio Access Network; Evolved Universal Terrestrial Radio Access (E-UTRA); Physical layer procedures (Release 13)," 3GPP TS 36.213 V13.2.0, pp. 1-381, 3rd Generation Partnership Project, Valbonne, France (Jun. 2016).

(Continued)

*Primary Examiner* — Jasper Kwoh
(74) *Attorney, Agent, or Firm* — Leydig, Voit & Mayer, Ltd.

(57) ABSTRACT

A method for scheduling resources is disclosed herein. A terminal device receives a downlink control information (DCI) indication sent by a network device. The DCI is used to indicate a first resource, and the first resource is a time-frequency resource for a narrowband physical uplink shared channel (NPUSCH) format 2 transmission. The NPUSCH format 2 is used to bear downlink hybrid automatic repeat request-acknowledgment (HARQ-ACK) feedback information. The terminal device determines the first (Continued)

resource according to the DCI, and sends a scheduling request to the network device on the first resource.

8 Claims, 10 Drawing Sheets

(51) Int. Cl.
    *H04L 1/18*     (2006.01)
    *H04L 5/00*     (2006.01)
    *H04W 72/04*     (2009.01)
    *H04W 74/08*     (2009.01)

(52) U.S. Cl.
    CPC .......... *H04W 4/80* (2018.02); *H04W 72/042* (2013.01); *H04W 74/0833* (2013.01)

(56) References Cited

U.S. PATENT DOCUMENTS

| | | | |
|---|---|---|---|
| 2010/0290409 A1* | 11/2010 | Acharya | H04L 27/2655 370/329 |
| 2012/0093106 A1 | 4/2012 | Dong | |
| 2015/0181624 A1 | 6/2015 | Hwang et al. | |
| 2016/0242171 A1 | 8/2016 | Kim et al. | |
| 2016/0316491 A1 | 10/2016 | Axmon et al. | |
| 2016/0365959 A1 | 12/2016 | Dinan | |
| 2019/0173703 A1* | 6/2019 | Gao | H04L 5/0055 |
| 2019/0387383 A1* | 12/2019 | Ye | H04W 4/80 |

FOREIGN PATENT DOCUMENTS

| | | |
|---|---|---|
| CN | 103906176 A | 7/2014 |
| CN | 105263191 A | 1/2016 |
| CN | 106413092 A | 2/2017 |
| JP | 2013527664 A | 6/2013 |
| JP | 2020501441 A | 1/2020 |
| JP | 2020511845 A | 4/2020 |
| WO | 2009038381 A2 | 3/2009 |
| WO | 2016163623 A1 | 10/2016 |

OTHER PUBLICATIONS

"On NR scheduling request," 3GPP TSG RAN WG1 Meeting #88, Athens, Greece, R1-1702993, pp. 1-4, 3rd Generation Partnership Project, Valbonne, France (Feb. 13 -17, 2017).
"Scheduling Request Multiplexing with ACK/NACK," 3GPP TSG-RAN WG1 Meeting #86, Gothenburg, Sweden, R1-166593, pp. 1-2, 3rd Generation Partnership Project, Valbonne, France (Aug. 22-26, 2016).
"3rd Generation Partnership Project; Technical Specification Group Radio Access Network; Evolved Universal Terrestrial Radio Access (E-UTRA); Physical channels and modulation (Release 14)," 3GPP TS 36.211 V14.2.0, pp. 1-196, 3rd Generation Partnership Project, Valbonne, France (Mar. 2017).
"Scheduling request design for NR," 3GPP TSG RAN WG1 Meeting #88, Athens, Greece, R1-1702234, pp. 1-5, 3rd Generation Partnership Project, Valbonne, France (Feb. 13-17, 2017).
"NB-IoT—Uplink control information," 3GPP TSG RAN1—Ad Hoc NB-IoT, R1-161875, pp. 1-6, 3rd Generation Partnership Project, Valbonne, France (Mar. 22-24, 2016).
"3rd Generation Partnership Project; Technical Specification Group Radio Access Network; Evolved Universal Terrestrial Radio Access (E-UTRA); Multiplexing and channel coding (Release 14)," 3GPP TS 36.212 V14.2.0, pp. 1-197, 3rd Generation Partnership Project, Valbonne, France (Mar. 2017).
"Performance evaluation of UL ACK/NACK transmission for NB-IOT," 3GPP TSG RAN WG1 NB-IOT Ad-Hoc Meeting, Sophia Antipolis, France, R1-161911, pp. 1-3, 3rd Generation Partnership Project, Valbonne, France (Mar. 22-24, 2016).
"3rd Generation Partnership Project; Technical Specification Group Radio Access Network; Evolved Universal Terrestrial Radio Access (E-UTRA); Physical layer procedures (Release 14)," 3GPP TS 36.213 V14.2.0, pp. 1-454, 3rd Generation Partnership Project, Valbonne, France (Mar. 2017).
"Discussion on UCI transmission for NB-IOT," 3GPP TSG RAN WG1 NB-IOT Ad-Hoc Meeting, Sophia Antipolis, France, R1-161910, pp. 1-3, 3rd Generation Partnership Project, Valbonne, France (Mar. 22-24, 2016).
"3rd Generation Partnership Project; Technical Specification Group Radio Access Network; Evolved Universal Terrestrial Radio Access (E-UTRA); Medium Access Control (MAC) protocol specification (Release 14)," 3GPP TS 36.321 V14.2.0, pp. 106, 3rd Generation Partnership Project, Valbonne, France (Mar. 2017).
"BS PUSCH Simulation Assumptions," 3GPP TSG-RAN WG4 Meeting #79, Nanjing, China, R4-164316, pp. 1-3, 3rd Generation Partnership Project, Valbonne, France (May 23-27, 2016).
"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331 V14.2.0, pp. 1-721, 3rd Generation Partnership Project, Valbonne, France (Mar. 2017).
"Contention-Free Preamble-Based Synchronized Random Access," 3GPP TSG RAN WG1 #47bis, Sorrento, Italy, R1-070259, pp. 1-6, 3rd Generation Partnership Project, Valbonne, France (Jan. 15-19, 2007).
"Contention-Free Preamble-Based Synchronized RACH: Comparison with other solutions," 3GPP TSG RAN WG1 #47bis, Sorrento, Italy, R1-070260, pp. 1-9, 3rd Generation Partnership Project, Valbonne, France (Jan. 15-19, 2007).
"Preamble Based Scheduling Request: a Generic Structure," 3GPP TSG RAN WG1 #49, Kobe, Japan, R1-072193, pp. 1-6, 3rd Generation Partnership Project, Valbonne, France (May 7-11, 2007).
LG Electronics, "Scheduling request by dedicated physical channel in NB-IoT," 3GPP TSG RAN WG1 Meeting #89, Hangzhou, P.R. China, R1-1707572, total 4 pages (May 15-19, 2017).

* cited by examiner

RESOURCE SCHEDULING METHOD, TERMINAL DEVICE, AND NETWORK DEVICE

CROSS-REFERENCE TO RELATED APPLICATIONS

This application is a continuation of International Application No. PCT/CN2017/084222, filed on May 12, 2017, which claims priority to International Application No. PCT/CN2017/078201, filed on Mar. 24, 2017. The disclosures of the aforementioned applications are hereby incorporated by reference in their entireties.

TECHNICAL FIELD

This application relates to communications technologies, and in particular, to a resource scheduling method, a terminal device, and a network device.

BACKGROUND

The Internet of things (IoT) is an "Internet of connected things". User ends on the Internet are expanded to things in the IoT, to perform information exchange and communication. The IoT has special requirements for, for example, coverage enhancement, supporting a large quantity of low-rate devices, very low costs, and low-energy consumption. A narrowband Internet of things (NB-IoT) system satisfies these special requirements of the IoT by providing a series of methods.

In the prior art, in the NB-IoT system, when needing to send uplink data to a network device, a terminal device needs to re-initiate random access before sending the uplink data.

However, by using a method in the prior art, the terminal device can send the uplink data only after the second message in a random access process is sent, leading to an increase in power consumption and delay of the terminal device.

SUMMARY

This application provides a resource scheduling method, a terminal device, and a network device, to resolve a prior-art problem that power consumption and delay of a terminal device are increased due to an excessively long uplink data requesting process.

A first aspect of this application provides a resource scheduling method. In the method, after receiving a configuration message of a network device, a terminal device obtains, based on the configuration message, first resource configuration information used to send a scheduling request, where the first resource configuration information includes information used to indicate a coverage enhancement level. Further, the terminal device sends a scheduling request to the network device on a first resource indicated by the first resource configuration information, where the scheduling request is used to request an uplink channel resource from the network device, and the terminal device performs no random access process when sending the scheduling request.

In the method, the network device sends the configuration message to the terminal device in advance. When the terminal device needs to send uplink data, the terminal device sends the scheduling request to the network device on the first resource indicated by the first resource configuration information that is in the configuration message, that is, notifies the network device that the terminal device needs to send data, and then directly sends the uplink data without performing a random access process, thereby reducing power consumption and delay of the terminal device.

Further, the first resource configuration information sent by the network device indicates coverage enhancement level information, to indicate the coverage enhancement level corresponding to the terminal device. That is, coverage levels can be distinguished for resources indicated by the first resource configuration information, thereby satisfying a requirement of terminal devices corresponding to different coverage levels in an NB-IoT system.

In an optional implementation, before the receiving, by a terminal device, a configuration message sent by a network device, the method further includes:

receiving, by the terminal device, a system message sent by the network device; and obtaining, by the terminal device, configuration information of a narrowband physical random access channel (NPRACH) resource based on the system message, where the NPRACH resource is a resource set of the first resource, or a subset of the NPRACH resource is a resource set of the first resource, or resources that are in the NPRACH resource and that are different from a resource used for contention-based random access are a resource set of the first resource, or a subset of resources that are in the NPRACH resource and that are different from a resource used for contention-based random access is a resource set of the first resource.

In an optional implementation, the terminal device adds data amount information of to-be-transmitted uplink data when sending the scheduling request to the network device.

In an optional implementation, the terminal device sends the scheduling request to the network device on the first resource with delay or in advance, where an amount of delay time or an amount of timing advance (TA) corresponding to the scheduling request has a preset correspondence with the data amount information of the to-be-transmitted uplink data; or the terminal device adds the data amount information of the to-be-transmitted uplink data when sending the scheduling request to the network device on the first resource, where the first resource includes a time domain resource, a frequency domain resource, a code resource, or a combination of a time domain resource, a frequency domain resource, and a code resource, and the time domain resource, the frequency domain resource, the code resource, or the combination of the time domain resource, the frequency domain resource, and the code resource has a preset correspondence with the data amount information of the to-be-transmitted uplink data.

In an optional implementation, a signal used by the terminal device to send the scheduling request is an NPRACH preamble, and the terminal device has performed TA adjustment before sending the scheduling request.

A second aspect of this application provides a resource scheduling method. In the method, a network device first sends a configuration message to a terminal device, where the configuration message is used by the terminal device to obtain first resource configuration information used to send a scheduling request, and the first resource configuration information includes information used to indicate a coverage enhancement level. Then, the network device receives a scheduling request sent by the terminal device on a first resource indicated by the first resource configuration information, where the scheduling request is used to request an uplink channel resource from the network device, and the terminal device performs no random access process when sending the scheduling request. Further, the network device allocates an uplink channel resource to the terminal device based on the scheduling request.

In an optional implementation, before the sending, by a network device, a configuration message to a terminal device, the method further includes:

sending, by the network device, a system message to the terminal device, where the system message carries configuration information of an NPRACH resource, where the NPRACH resource is a resource set of the first resource, or a subset of the NPRACH resource is a resource set of the first resource, or resources that are in the NPRACH resource and that are different from a resource used for contention-based random access are a resource set of the first resource, or a subset of resources that are in the NPRACH resource and that are different from a resource used for contention-based random access is a resource set of the first resource.

In an optional implementation, the network device may determine data amount information of to-be-transmitted uplink data based on the scheduling request sent by the terminal device.

In an optional implementation, the network device determines the data amount information of the to-be-transmitted uplink data based on an amount of delay time or an amount of TA corresponding to the scheduling request received on the first resource, where the amount of delay time or the amount of TA corresponding to the scheduling request has a preset correspondence with the data amount information of the to-be-transmitted uplink data; or the network device determines the data amount information of the to-be-transmitted uplink data based on the first resource corresponding to the received scheduling request, where the first resource includes a time domain resource, a frequency domain resource, a code resource, or a combination of a time domain resource, a frequency domain resource, and a code resource, and the time domain resource, the frequency domain resource, the code resource, or the combination of the time domain resource, the frequency domain resource, and the code resource has a preset correspondence with the data amount information of the to-be-transmitted uplink data.

In an optional implementation, a signal used by the network device to receive the scheduling request is an NPRACH preamble, and the terminal device has performed TA adjustment before sending the scheduling request.

In an optional implementation, the system message carries a first preset parameter and a second preset parameter, where a carrier location of the resource set of the first resource is determined based on a carrier location of the NPRACH resource and the first preset parameter, and a start subcarrier location of the resource set of the first resource is determined based on a start subcarrier location of the NPRACH resource and the second preset parameter; or a carrier location of the resource set of the first resource is determined based on a carrier location of the subset of the NPRACH resource and the first preset parameter, and a start subcarrier location of the resource set of the first resource is determined based on a start subcarrier location of the subset of the NPRACH resource and the second preset parameter.

In an optional implementation, the system message carries a first offset parameter and a second offset parameter, where the carrier location of the resource set of the first resource is determined based on the carrier location of the NPRACH resource and the first offset parameter, and the start subcarrier location of the resource set of the first resource is determined based on the start subcarrier location of the NPRACH resource and the second offset parameter; or the carrier location of the resource set of the first resource is determined based on the carrier location of the subset of the NPRACH resource and the first offset parameter, and the start subcarrier location of the resource set of the first resource is determined based on the start subcarrier location of the subset of the NPRACH resource and the second offset parameter.

In an optional implementation, the system message carries a first preset scale factor and a second preset scale factor, where the carrier location of the resource set of the first resource is determined based on the carrier location of the NPRACH resource and the first preset scale factor, and the start subcarrier location of the resource set of the first resource is determined based on the start subcarrier location of the NPRACH resource and the second preset scale factor; or the carrier location of the resource set of the first resource is determined based on the carrier location of the subset of the NPRACH resource and the first preset scale factor, and the start subcarrier location of the resource set of the first resource is determined based on the start subcarrier location of the subset of the NPRACH resource and the second preset scale factor.

A third aspect of this application provides a resource scheduling method. In the method, a terminal device receives a downlink control information (DCI) indication sent by a network device, where the DCI is used to indicate a first resource, and the first resource is a time-frequency resource for a narrowband physical uplink shared channel (NPUSCH) format 2 transmission. Then, the terminal device determines the first resource based on the DCI. Further, the terminal device sends a scheduling request to the network device on the first resource.

In the method, the terminal device sends the scheduling request to the network device on the first resource, where the first resource is a time-frequency resource for NPUSCH format 2 transmission. That is, the terminal device can use the NPUSCH format 2 to send the scheduling request, thereby reducing resources specially used for the scheduling request.

In an optional implementation, the sending, by the terminal device, a scheduling request to the network device on the first resource includes:

transmitting, by the terminal device, both the scheduling request and hybrid automatic repeat request-acknowledgment (HARQ-ACK) feedback information on the first resource through higher order modulation.

In an optional implementation, the terminal device performs phase rotation on a modulation symbol corresponding to the HARQ-ACK feedback message, to transmit both the scheduling request and the HARQ-ACK feedback information on the first resource.

In an optional implementation, the terminal device multiplies a modulation symbol or an encoded bit corresponding to the HARQ-ACK feedback information by preset orthogonal codes, to transmit both the scheduling request and the HARQ-ACK feedback information on the first resource.

In an optional implementation, the preset orthogonal codes are a Hadamard sequence having a length of 16.

In an optional implementation, the terminal device determines a first transmission sequence based on the HARQ-ACK feedback information and a preset orthogonal sequence, and transmits the first transmission sequence on the first resource, where the first transmission sequence is used to carry both the HARQ-ACK feedback information and scheduling request information.

In this implementation, the terminal device transmits the HARQ-ACK feedback information and the scheduling request based on a modulation symbol corresponding to a HARQ-ACK and the preset orthogonal sequence, so that the network device receiving the information only needs to directly perform coherent combination to complete sequence detection, without performing a complex decoding operation when detecting whether there is a scheduling request, thereby reducing detection complexity.

In an optional implementation, the preset orthogonal sequence is a first orthogonal sequence or a second orthogonal sequence, where the first orthogonal sequence is used when there is no scheduling request to be transmitted, and the second orthogonal sequence is used when there is a scheduling request to be transmitted.

In this implementation, the orthogonal sequence has good mutual correlation, so that a state in which there is a scheduling request and a state in which there is no scheduling request can be effectively distinguished.

In an optional implementation, if there is no scheduling request to be transmitted, and the HARQ-ACK feedback information is an acknowledgment (ACK), the first transmission sequence is a sequence of complex symbols, where the sequence of complex symbols is determined based on a modulation symbol corresponding to the ACK and the first orthogonal sequence.

In an optional implementation, if there is no scheduling request to be transmitted, and the HARQ-ACK feedback information is a negative acknowledgement (NACK), the first transmission sequence is a sequence of complex symbols, where the sequence of complex symbols is determined based on a modulation symbol corresponding to the NACK and the first orthogonal sequence.

In an optional implementation, if there is a scheduling request to be transmitted, and the HARQ-ACK feedback information is an ACK, the first transmission sequence is a sequence of complex symbols, where the sequence of complex symbols is determined based on a modulation symbol corresponding to the ACK and the second orthogonal sequence.

In an optional implementation, if there is a scheduling request to be transmitted, and the HARQ-ACK feedback information is an NACK, the first transmission sequence is a sequence of complex symbols, where the sequence of complex symbols is a sequence of complex symbols determined based on a modulation symbol corresponding to the NACK and the second orthogonal sequence.

In an optional implementation, a quantity of elements in the first orthogonal sequence is the same as a quantity of elements in the second orthogonal sequence. In addition, the first orthogonal sequence and the second orthogonal sequence are orthogonal.

In an optional implementation, a quantity of elements in the first orthogonal sequence is the same as a quantity of modulation symbols corresponding to an ACK. In addition, the quantity of elements in the first orthogonal sequence is the same as a quantity of modulation symbols corresponding to an NACK.

In an optional implementation, the first orthogonal sequence and the second orthogonal sequence each are a row in a 16-order Hadamard matrix, or the first orthogonal sequence and the second orthogonal sequence each are a column in a 16-order Hadamard matrix.

In an optional implementation, the preset orthogonal sequence is a third orthogonal sequence.

In an optional implementation, the third orthogonal sequence is used when there is a scheduling request to be transmitted.

In this implementation, the HARQ-ACK feedback information implicitly carries a full "1" sequence. Therefore, one orthogonal sequence may be used to carry both the scheduling request and the HARQ-ACK feedback information. In addition, a quantity of sequence detections can be reduced, thereby reducing complexity and power consumption.

In an optional implementation, if there is a scheduling request to be transmitted, and the HARQ-ACK feedback information is an ACK, the first transmission sequence is a sequence of complex symbols, where the sequence of complex symbols is determined based on a modulation symbol corresponding to the ACK and the third orthogonal sequence.

In an optional implementation, if there is a scheduling request to be transmitted, and the HARQ-ACK feedback information is an NACK, the first transmission sequence is a sequence of complex symbols, where the sequence of complex symbols is determined based on a modulation symbol corresponding to the NACK and the third orthogonal sequence.

In an optional implementation, a quantity of elements in the third orthogonal sequence is the same as a quantity of modulation symbols corresponding to an ACK. In addition, the quantity of elements in the third orthogonal sequence is the same as a quantity of modulation symbols corresponding to an NACK.

In an optional implementation, the third orthogonal sequence is a row or a column in a 16-order Hadamard matrix.

In an optional implementation, the method further includes:

adding, by the terminal device, data amount information of to-be-transmitted uplink data when sending the scheduling request to the network device.

In an optional implementation, the data amount information of the to-be-transmitted uplink data has a preset correspondence with a constellation point of the higher order modulation.

In an optional implementation, the data amount information of the to-be-transmitted uplink data has a preset correspondence with a magnitude of the phase rotation.

In an optional implementation, the data amount information of the to-be-transmitted uplink data has a preset correspondence with a sequence of the preset orthogonal codes.

A fourth aspect of this application provides a resource scheduling method. In the method, a network device first sends a DCI indication to a terminal device, where the DCI is used to indicate a first resource, and the first resource is a time-frequency resource for NPUSCH format 2 transmission. Then, the network device receives a scheduling request sent by the terminal device on the first resource. Further, the network device allocates an uplink channel resource to the terminal device based on the scheduling request.

In an optional implementation, the terminal device transmits both the scheduling request and HARQ-ACK feedback information on the first resource through higher order modulation. The network device determines, based on a received signal obtained after the higher order modulation, whether the terminal device has sent the scheduling request.

In an optional implementation, the terminal device performs phase rotation on a modulation symbol corresponding to the HARQ-ACK feedback message, to transmit both the scheduling request and the HARQ-ACK feedback information on the first resource. The network device determines, based on the received modulation symbol that undergoes the phase rotation, whether the terminal device has sent the scheduling request.

In an optional implementation, the terminal device multiplies a modulation symbol or an encoded bit corresponding to the HARQ-ACK feedback information by preset orthogonal codes, to transmit both the scheduling request and the HARQ-ACK feedback information on the first resource. The network device determines, based on a received modulation symbol obtained after multiplication by the preset orthogonal codes, whether the terminal device has sent the scheduling request.

In an optional implementation, the preset orthogonal codes are a Hadamard sequence having a length of 16.

In an optional implementation, the network device determines data amount information of to-be-transmitted uplink data based on the scheduling request sent by the terminal device.

In an optional implementation, the data amount information of the to-be-transmitted uplink data has a preset correspondence with a constellation point of the higher order modulation.

In an optional implementation, the data amount information of the to-be-transmitted uplink data has a preset correspondence with a magnitude of the phase rotation.

In an optional implementation, the data amount information of the to-be-transmitted uplink data has a preset correspondence with a sequence of the preset orthogonal codes.

A fifth aspect of this application provides a terminal device. The terminal device has functions of implementing the terminal device in the first aspect. The functions may be implemented by using hardware, or may be implemented by hardware executing corresponding software. The hardware or software includes one or more modules corresponding to the foregoing functions.

In a possible design, the terminal device may include a receiving module, a processing module, and a sending module. The modules can perform corresponding functions in the foregoing methods. For example, the receiving module is configured to receive a configuration message sent by a network device. The processing module is configured to obtain, based on the configuration information received by the receiving module, first resource configuration information used to send a scheduling request, where the first resource configuration information includes information used to indicate a coverage enhancement level. The sending module is configured to send a scheduling request to the network device on a first resource indicated by the first resource configuration information obtained by the processing module, where the scheduling request is used to request an uplink channel resource from the network device, and the terminal device performs no random access process when sending the scheduling request.

A sixth aspect of this application provides a network device. The network device has functions of implementing the network device in the second aspect. The functions may be implemented by using hardware, or may be implemented by hardware executing corresponding software. The hardware or software includes one or more modules corresponding to the foregoing functions.

In a possible design, the network device may include a sending module, a receiving module, and a processing module. The modules can perform corresponding functions in the foregoing methods. For example, the sending module is configured to send a configuration message to a terminal device, where the configuration message is used by the terminal device to obtain first resource configuration information used to send a scheduling request, and the first resource configuration information includes information used to indicate a coverage enhancement level. The receiving module is configured to receive a scheduling request sent by the terminal device on a first resource indicated by the first resource configuration information, where the scheduling request is used to request an uplink channel resource from the network device, and the terminal device performs no random access process when sending the scheduling request. The processing module is configured to allocate an uplink channel resource to the terminal device based on the scheduling request received by the receiving module.

A seventh aspect of this application provides a terminal device. The terminal device has functions of implementing the terminal device in the third aspect. The functions may be implemented by using hardware, or may be implemented by hardware executing corresponding software. The hardware or software includes one or more modules corresponding to the foregoing functions.

In a possible design, the terminal device may include a receiving module, a processing module, and a sending module. The modules can perform corresponding functions in the foregoing methods. For example, the receiving module is configured to receive a DCI indication sent by a network device, where the DCI is used to indicate a first resource, and the first resource is a time-frequency resource for NPUSCH format 2 transmission. The processing module is configured to determine the first resource based on the DCI. The sending module is configured to send a scheduling request to the network device on the first resource.

An eighth aspect of this application provides a network device. The network device has functions of implementing the network device in the fourth aspect. The functions may be implemented by using hardware, or may be implemented by hardware executing corresponding software. The hardware or software includes one or more modules corresponding to the foregoing functions.

In a possible design, the network device may include a sending module, a receiving module, and a processing module. The modules can perform corresponding functions in the foregoing methods. For example, the sending module is configured to send a DCI indication to a terminal device, where the DCI is used to indicate a first resource, and the first resource is a time-frequency resource for NPUSCH format 2 transmission. The receiving module is configured to receive a scheduling request sent by the terminal device on the first resource. The processing module is configured to allocate an uplink channel resource to the terminal device based on the scheduling request.

A ninth aspect of this application provides a terminal device. The terminal device includes a memory and a processor. The memory is configured to store a program instruction. The processor is configured to invoke the program instruction in the memory, to implement the method according to the first aspect and the implementations of the first aspect.

A tenth aspect of this application provides a network device. The network device includes a memory and a processor. The memory is configured to store a program instruction, and the processor is configured to invoke the program instruction in the memory, to implement the method according to the second aspect and the implementations of the second aspect.

An eleventh aspect of this application provides a terminal device. The terminal device includes a memory and a processor. The memory is configured to store a program instruction, and the processor is configured to invoke the program instruction in the memory, to implement the method according to the third aspect and implementations of the third aspect.

A twelfth aspect of this application provides a network device. The network device includes a memory and a processor. The memory is configured to store a program instruction, and the processor is configured to invoke the program instruction in the memory, to implement the method according to the fourth aspect and the implementations of the fourth aspect.

DESCRIPTION OF EMBODIMENTS

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In various communications systems, to avoid a waste of resources, if a terminal device does not have uplink data that needs to be transmitted, a network device does not allocate an uplink resource to the terminal device. When the terminal device has an uplink resource that needs to be transmitted, the terminal device first needs to notify the network device that the terminal device needs to transmit the uplink resource, to request the network device to allocate an uplink resource to the terminal device.

Figure 1:
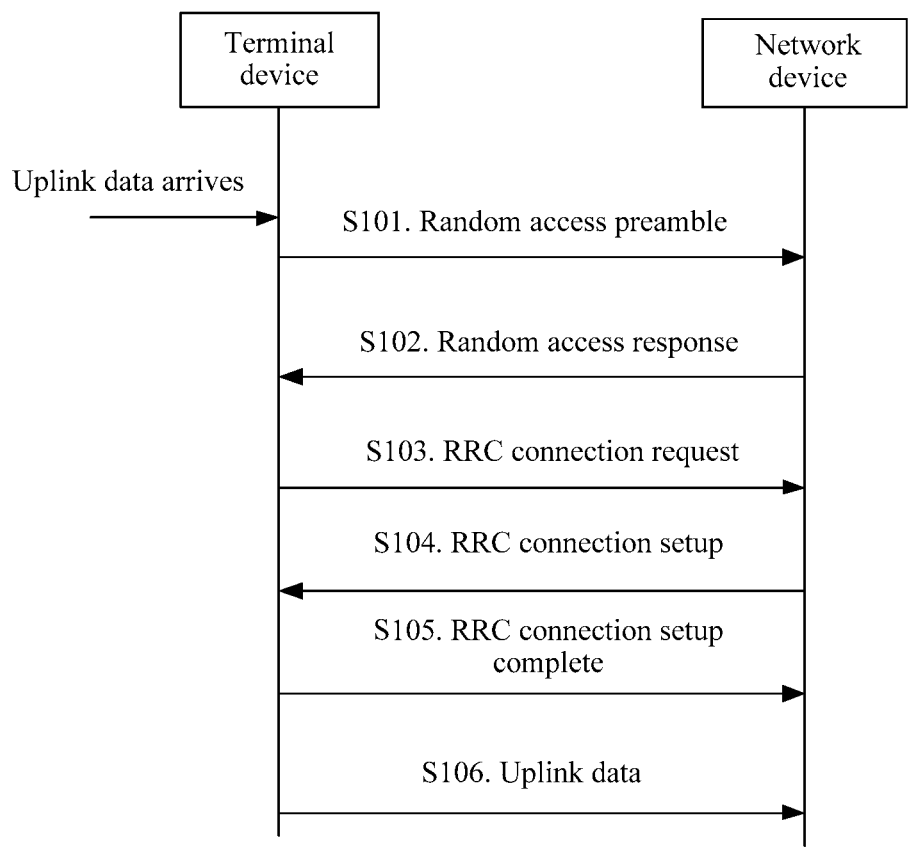
FIG. 1 shows an example of a processing process when a terminal device needs to send uplink data to a network device in an existing NB-IoT system.

In an existing NB-IoT system, when needing to send uplink data to a network device, a terminal device needs to re-initiate random access before sending the uplink data. FIG. 1 shows an example of a processing process when the terminal device needs to send uplink data to the network device in the existing NB-IoT system. As shown in FIG. 1, after receiving uplink data, the terminal device re-initiates random access. A specific process includes the following steps:

S101. The terminal device sends an access preamble to the network device.

S102. The network device returns a random access response to the terminal device.

S103. The terminal device receives the response, and then initiates a radio resource control (RRC) request to the network device.

S104. The network device sends an RRC connection setup message to the terminal device.

S105. The terminal device sends an RRC connection setup complete message to the network device.

S106. The terminal device sends uplink data to the network device.

The terminal device can report an amount of the uplink data to the network device and send the uplink data to the network device at least after S103.

That is, in the prior art, the terminal device can send the uplink data only after waiting a relatively long time and performing more operations. This increases power consumption and delay of the terminal device. In addition, when an access conflict occurs on a plurality of terminal devices, the terminal devices may be back off or even fail, further increasing the power consumption and delay of the terminal device.

In view of the foregoing problem, this application provides a resource scheduling method. A network device sends configuration information to a terminal device in advance. When the terminal device has uplink data that needs to be sent, the terminal device sends a scheduling request to the network device on a particular resource indicated by the configuration information, that is, notifies the network device that the terminal device needs to send data, and then directly sends the uplink data without performing a random access process, thereby reducing power consumption and delay of the terminal device.

In addition, the configuration information sent by the network device includes information such as a coverage enhancement level index or a quantity of repetitions, which directly or indirectly indicates a coverage enhancement level corresponding to the terminal device. That is, coverage levels can be distinguished for resources indicated by the configuration information, thereby satisfying a requirement of an NB-IoT system for a coverage level.

Figure 2:
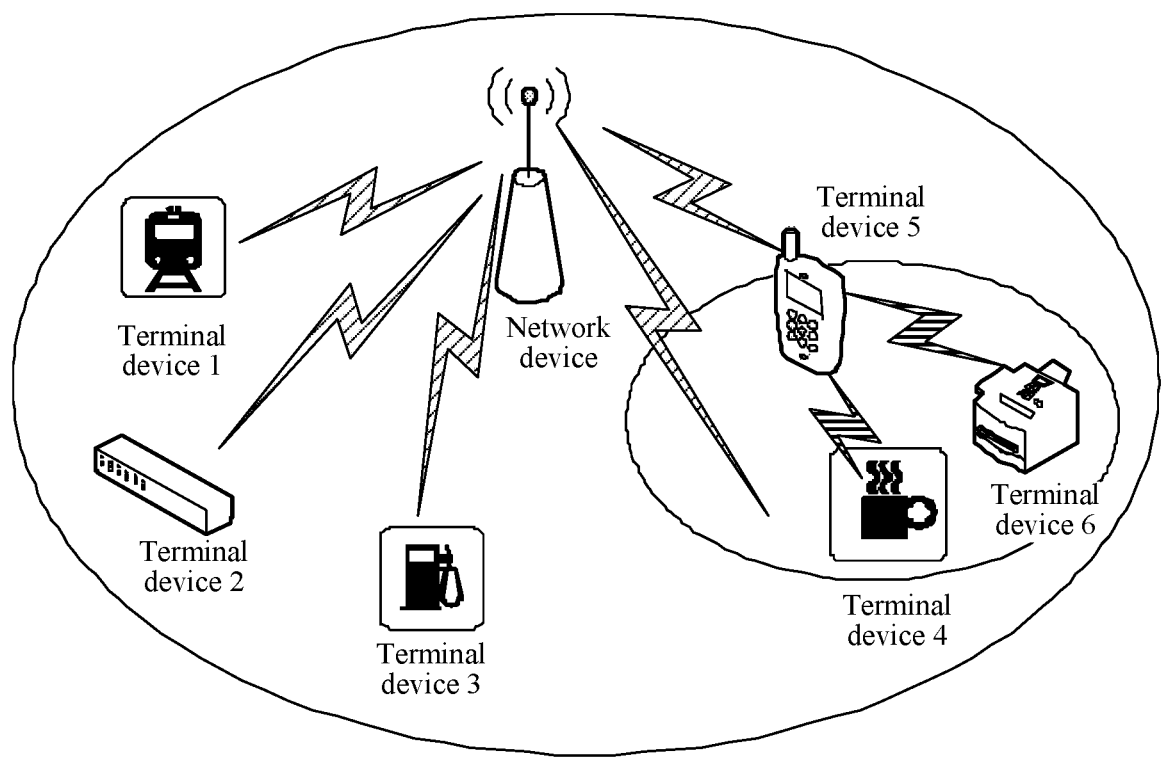
FIG. 2 is a system architectural diagram of a resource scheduling method according to this application.

FIG. 2 is a system architectural diagram of a resource scheduling method according to this application. As shown in FIG. 2, in the NB-IoT system, a network device may communicate with a plurality of terminal devices. The network device may be a base station, and the terminal device may be any terminal device that can perform machine-type communication, such as a mobile phone or a printer. The method provided in this application is applicable to any terminal device.

Figure 3:
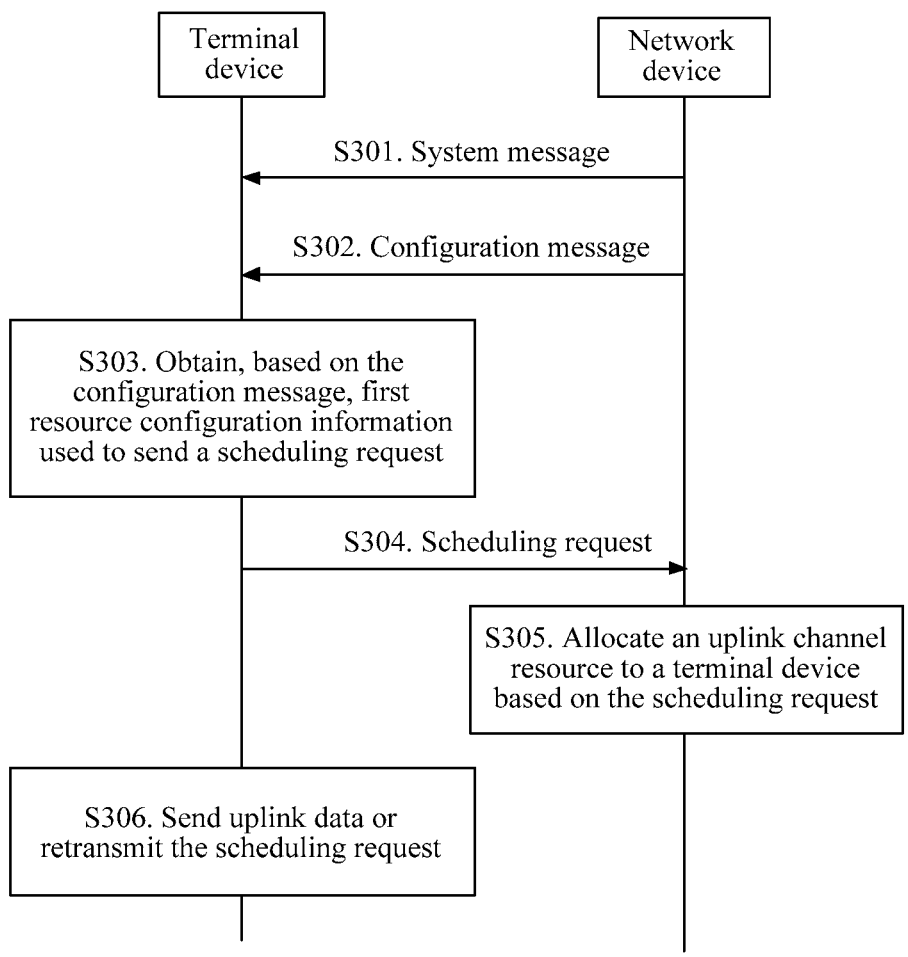
FIG. 3 is an interaction flowchart of Embodiment 1 of a resource scheduling method according to this application.

FIG. 3 is an interaction flowchart of Embodiment 1 of a resource scheduling method according to this application. As shown in FIG. 3, an execution process of the method is as follows:

S301. A network device sends a system message.

The network device may notify, by using the system message, all terminal devices in a serving cell of a configuration parameter of an available resource set, where the resource set is used by each of the terminal devices to send a scheduling request to the network device. For example, the resource set may be an uplink random access channel (NPRACH) resource, an NPRACH resource subset, an uplink data channel (NPUSCH) format 1 resource, an NPUSCH format 1 resource subset, an NPUSCH format 2 resource, or an NPUSCH format 2 resource subset. For example, when the resource set is an NPRACH resource, the network device may indicate, in the system message, configuration information of the NPRACH resource, such as a carrier frequency, a quantity of carriers, a quantity of subcarriers, a frequency domain location of a start subcarrier, a coverage enhancement level index, a quantity of repetitions, a period, a start time point, a preamble format, and a maximum quantity of preamble transmission attempts. The coverage enhancement level index or the quantity of repetitions may be used to indicate a coverage enhancement level corresponding to a resource.

As described above, in this application, a scheduling request is sent on a particular resource and no random access process is performed, to reduce power consumption and delay of a terminal device. Based on a feature of coverage enhancement in an NB-IoT system, coverage levels need to be distinguished for the particular resource, and coverage levels can be distinguished for the NPRACH resource. Therefore, in an optional implementation, the NPRACH resource may be used as the particular resource for sending the scheduling request in this application. In this way, the following feature of the NPRACH resource is inherited: coverage levels can be distinguished for the NPRACH resource, thereby effectively balancing resources and performance. In addition, there is a conflict resolution mechanism for the NPRACH resource and uplink data. To be specific, when the NPRACH conflicts with the uplink data, the uplink data is sent with delay. When the NPRACH resource is used as the particular resource for sending the scheduling request, the foregoing conflict mechanism may be inherited, thereby avoiding extra restrictions imposed on scheduling of the network device, and maintaining better backward compatibility. Before the NPRACH resource is used, carriers and subcarriers that are specifically used in the NPRACH resource need to be determined. Some carriers and subcarriers in the NPRACH resource may be directly used based on a current configuration of the NPRACH resource, or carriers and subcarriers that need to be used in the NPRACH resource may be calculated based on a specific parameter. Alternatively, another resource other than the NPRACH resource may be used as the particular resource.

Therefore, optionally, the particular resource for sending the scheduling request in this application may be determined in the following three manners:

First Manner:

Resources in the NPRACH resource are directly determined as the particular resource based on the current configuration of the NPRACH resource.

In this manner, NPRACH resources used as the particular resource may be pre-configured in the network device and the terminal device or indicated by using a message, or NPRACH resources used as the particular resource may be agreed on according to a rule specified in a protocol, or NPRACH resources used as the particular resource may be agreed on according to a rule self-defined by an operator or a manufacturer. In this way, the network device does not need to perform the notification operation by using the system message in this step.

Second Manner:

Some parameters are set, and resources in the NPRACH resource that are used as the particular resource are determined based on a current NPRACH resource set and the parameters.

In this manner, the network device may indicate the parameters by using the system message. That is, in addition to indicating the information such as a carrier frequency and a quantity of carriers of the NPRACH resource in the system message, the network device may indicate and determine the parameters corresponding to the particular resource for sending the scheduling request.

Third Manner:

The network device directly indicates, by using the system message, a resource set that may be used as the particular resource, without depending on an NPRACH resource set, and the network device may indicate a configuration parameter of the particular resource in the system message, including a carrier location, a quantity of carriers, a quantity of subcarriers, a frequency domain location of a start subcarrier, a maximum quantity of scheduling request transmissions, and the like.

Because the network device directly indicates the configuration parameter of the particular resource by using the system message, the resource determined in this manner may be the NPRACH resource or may be a resource different from the NPRACH resource.

Specific implementation methods of the foregoing three manners are described in detail after this embodiment.

S302. The network device sends a configuration message to the terminal device.

The configuration message is used to indicate, to the terminal device, first resource configuration information used to send a scheduling request.

S303. The terminal device obtains, based on the configuration message, the first resource configuration information used to send a scheduling request.

After receiving the configuration message, the terminal device obtains the first resource configuration information carried in the configuration message, where the first resource configuration information may include a carrier index, a start subcarrier index, a maximum quantity of scheduling request transmissions, information used to indicate a coverage enhancement level, and the like, where the information used to indicate the coverage enhancement level may be specifically a coverage enhancement level index or a quantity of repetitions.

In an example of the first manner in the three manners described in step S301, the NPRACH resource is directly used as the particular resource for sending a scheduling request. In this case, first, in the system message in S301, the network device broadcasts an NPRACH resource set to all the terminal devices in the serving cell, including a quantity of carriers, a quantity of subcarriers, a frequency domain location of a start subcarrier, a quantity of repetitions, and the like. After receiving the system message, the terminal device learns configuration information of the NPRACH resource set. Further, the network device determines, based on the pre-configured configuration information of the particular resource, a particular resource corresponding to a particular terminal device sending the scheduling request, and notifies, by using information such as a carrier index, a start subcarrier index, and a frequency domain location of a start subcarrier, the particular terminal device of subcarriers in carriers that are used to send the scheduling request.

Coverage levels can be distinguished for the NPRACH resource. Each group of NPRACH resources in the NPRACH resource set indicated in the system message of the network device corresponds to one coverage enhancement level. The network device allocates, to the terminal device based on the coverage enhancement level of the terminal device and the pre-configured configuration information, a resource that is in the NPRACH resource set and that satisfies a coverage requirement of the terminal device.

In an optional implementation, the network device may specifically send the first resource configuration information by using an RRC message in a contention-based random access process, where the RRC message is specifically the fourth message obtained in the contention-based random access process.

S304. When uplink data arrives, the terminal device sends a scheduling request to the network device on a first resource indicated by the first resource configuration information, and the terminal device starts a timer to count a quantity of times of transmitting the scheduling request.

The first resource is a subset of the particular resource for sending the scheduling request. To be specific, the particular resource is a resource set of the first resource.

The scheduling request is used to request an uplink channel resource from the network device, and the terminal device performs no random access process when sending the scheduling request.

Specifically, the terminal device sends the scheduling request, to be specific, requests the uplink channel resource from the network device, on the first resource determined in the foregoing step. This is different from the prior art in which random access needs to be re-initiated to request the uplink channel resource from the network device.

S305. The network device detects, on the first resource, the scheduling request sent by the terminal device, and allocates an uplink channel resource to the terminal device based on the scheduling request if the network device detects the scheduling request, or does not perform a transmission operation if the network device does not detect the scheduling request.

S306. If the terminal device receives, before the timer expires, the uplink channel resource allocated by the network device, the terminal device sends a buffer status report or the uplink data on the uplink channel resource allocated by the network device; otherwise, the terminal device retransmits the scheduling request on the first resource. If the quantity of times of transmitting the scheduling request exceeds a maximum transmission quantity that a scheduler requests for transmission, the terminal device triggers a random access process.

In this embodiment, the network device sends the configuration message to the terminal device in advance. When the terminal device needs to send uplink data, the terminal device sends the scheduling request to the network device on the first resource indicated by the first resource configuration information that is in the configuration message, that is, notifies the network device that the terminal device needs to send data, and then directly sends the uplink data without performing a random access process, thereby reducing power consumption and delay of the terminal device.

Further, the first resource configuration information sent by the network device indicates coverage enhancement level information, to indicate the coverage enhancement level corresponding to the terminal device. That is, coverage levels can be distinguished for resources indicated by the first resource configuration information, thereby satisfying a requirement of terminal devices corresponding to different coverage levels in an NB-IoT system.

The foregoing three manners of determining the particular resource for sending a scheduling request are described in detail below.

First Manner:

Resources in the NPRACH resource are directly determined as the particular resource based on the current configuration of the NPRACH resource.

In this manner, NPRACH resources used as the particular resource may be pre-configured in the network device and the terminal device or indicated by using a message, or NPRACH resources used as the particular resource may be agreed on according to a rule specified in a protocol, or NPRACH resources used as the particular resource may be agreed on according to a rule self-defined by an operator or a manufacturer. In this way, the network device does not need to perform the notification operation by using the system message in this step.

Figure 4:
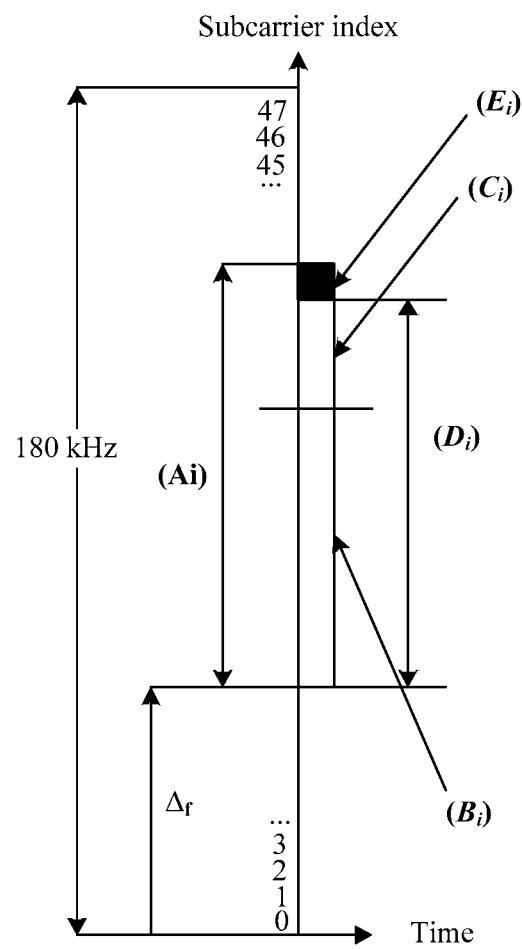
FIG. 4 is a schematic distribution diagram of NPRACH frequency domain resources within an NB-IoT carrier in an existing NB-IoT system.

Specifically, FIG. 4 is a schematic distribution diagram of NPRACH frequency domain resources within an NB-IoT carrier in an existing NB-IoT system. As shown in FIG. 4, assuming that a universal set of the NPRACH frequency domain resources is A, a frequency domain location of a start subcarrier that corresponds to each coverage enhancement level and that is allocated to an NPRACH resource is denoted as $\Delta_f$, the NB-IoT can support m NB-IoT carriers, and an NPRACH frequency domain resource within one NB-IoT carrier is $\Delta_i$, where i=0, . . . , m−1, $$A = \sum_{i=0}^{m-1} A_i.$$

An NPRACH frequency domain resource for indicating user equipment (UE) support for single-tone Msg3 within one NB-IoT carrier is denoted as Br, where i=0, . . . , m−1. An NPRACH frequency domain resource for indicating UE support for multi-tone Msg3 within one NB-IoT carrier is denoted as $C_i$, where i=0, . . . , m−1. An NPRACH frequency domain resource for indicating contention-based random access within one NB-IoT carrier is denoted as $D_i$, where i=0, . . . , m−1, and $D_i=B_i+C_i$. A resource that is within one NB-IoT carrier and that is different from the NPRACH frequency domain resource for the contention-based random access is denoted as $E_i$, where i=0, . . . , m−1. In this case, $D_i+E_i=A_i$.

When NPRACH frequency domain resources used as frequency domain resources of the particular resource are pre-configured in the network device and the terminal device or indicated by using a message, or NPRACH frequency domain resources used as frequency domain resources of the particular resource are agreed on according to a rule specified in a protocol, or NPRACH frequency domain resources used as frequency domain resources of the particular resource are agreed on according to a rule self-defined by an operator or a manufacturer, it may be directly indicated or agreed on that $A_i$, $B_i$, $C_i$, $D_i$, $E_i$, $A_i-B_i$, $A_i-D_i$, and $A_i-E_i$ indicate the frequency domain resources of the particular resource, where i=0, . . . , m−1 or i=1, . . . , m−1. For example, it may be configured, indicated, or agreed on that the frequency domain resources of the particular resource are $A_i$–$D_i$ or $E_i$. In this case, it represents that within each NB-IoT carrier within which the scheduling request can be sent, a frequency domain resource that is in the NPRACH frequency domain resources and that is different from the frequency domain resource allocated for the contention-based random access may be used as a frequency domain resource of the particular resource.

In some optional implementations, $A_i$, $B_i$, $C_i$, $D_i$, and $E_i$ may be calculated in different manners, so that the frequency domain resources of the particular resource are a subset of the NPRACH frequency domain resources, or the particular resource is a resource that is in the NPRACH resource and that is different from the resource used for the contention-based random access.

In addition, in this manner, configuration parameters of an existing NPRACH time domain resource, such as a period, a sending start time point, and a time offset relative to a start time point of the period, may be used for a time domain resource of the particular resource.

Second Manner:

Some parameters are set, calculation is performed on a current NPRACH resource set based on the parameters, and resources in the NPRACH resource that are used as the particular resource are determined.

In this manner, the network device may indicate the parameters by using the system message. That is, in addition to indicating the information such as a carrier frequency and a quantity of carriers of the NPRACH resource in the system message, the network device may indicate and determine the parameters corresponding to the particular resource for sending the scheduling request.

This manner may be applied to an NB-IoT carrier dimension, a subcarrier dimension, or both an NB-IoT carrier dimension and a subcarrier dimension. In addition, a carrier location corresponding to the particular resource may be determined based on a carrier location of the NPRACH resource and a parameter indicated by using the system message, or a carrier location of the particular resource may be determined based on a carrier location of a subset of the NPRACH resource and a parameter indicated by using the system message.

Specifically, there are the following several cases:

1. This manner is applied to the NB-IoT carrier dimension, and the carrier location corresponding to the particular resource is determined based on the carrier location of the NPRACH resource and a preset parameter indicated by using the system message.

2. This manner is applied to the NB-IoT carrier dimension, and the carrier location corresponding to the particular resource is determined based on the carrier location of the subset of the NPRACH resource and a preset parameter indicated by using the system message.

3. This manner is applied to the subcarrier dimension, and a start subcarrier location corresponding to the particular resource is determined based on a start subcarrier location of the NPRACH resource and a preset parameter indicated by using the system message.

4. This manner is applied to the subcarrier dimension, and a start subcarrier location corresponding to the particular resource is determined based on a start subcarrier location of the subset of the NPRACH resource and a preset parameter indicated by using the system message.

5. This manner is applied to both the NB-IoT carrier dimension and the subcarrier dimension, the carrier location corresponding to the particular resource is determined based on the carrier location of the NPRACH resource and a first preset parameter indicated by using the system message, and a start subcarrier location corresponding to the particular resource is determined based on a start subcarrier location of the NPRACH resource and a second preset parameter indicated by using the system message.

6. This manner is applied to both the NB-IoT carrier dimension and the subcarrier dimension, the carrier location corresponding to the particular resource is determined based on the carrier location of the subset of the NPRACH resource and a first preset parameter indicated by using the system message, and a start subcarrier location corresponding to the particular resource is determined based on a start subcarrier location of the subset of the NPRACH resource and a second preset parameter indicated by using the system message.

In the fifth and the sixth cases, values of the first preset parameters may be the same or different. That is, a same parameter or different parameters may be used for a carrier and a subcarrier.

The preset parameter, the first preset parameter, and the second preset parameter indicated by using the system message may be specifically offset parameters for the NPRACH resource or the subset of the NPRACH resource, or may be scale factors for the NPRACH resource or the subset of the NPRACH resource.

When the preset parameter, the first preset parameter, and the second preset parameter are offset parameters, in an example of the fifth and the sixth cases, specifically:

the carrier location of the particular resource is determined based on the carrier location of the NPRACH resource and a first offset parameter, and the start subcarrier location of the particular resource is determined based on the start subcarrier location of the NPRACH resource and the first offset parameter; or the carrier location of the particular resource is determined based on the carrier location of the subset of the NPRACH resource and a first offset parameter, and the start subcarrier location of the particular resource is determined based on the start subcarrier location of the subset of the NPRACH resource and a second offset parameter.

The first offset parameter and the second offset parameter are configured by using the system message sent by the network device.

When the preset parameter, the first preset parameter, and the second preset parameter are scale factors, in an example of the fifth and the sixth cases, specifically:

the carrier location of the particular resource is determined based on the carrier location of the NPRACH resource and a first preset scale factor, and the start subcarrier location of the particular resource is determined based on the start subcarrier location of the NPRACH resource and a second preset scale factor; or the carrier location of the particular resource is determined based on the carrier location of the subset of the NPRACH resource and a first preset scale factor, and the start subcarrier location of the particular resource is determined based on the start subcarrier location of the subset of the NPRACH resource and a second preset scale factor.

The first preset scale factor and the second preset scale factor are configured by using the system message sent by the network device.

Examples of the foregoing process continue to be described with reference to division of the NPRACH resource shown in FIG. 4.

1. Subcarrier Dimension

It is assumed that the offset parameter is $F_i$, where $i=0, \ldots, m-1$. F may be a frequency domain offset relative to a start subcarrier of $A_i$, $B_i$, $C_i$, $D_i$, or $E_i$ or may be a frequency domain offset relative to a start subcarrier of $A_i$-$B_i$, $A_i$-$D_i$, or $A_i$-$E_i$.

It is assumed that the scale factor is $\alpha_i$, where i=0, ..., m−1. A ratio $\alpha_i$ in $A_i$, $B_i$, $C_i$, $D_i$, or $E_i$ may be configured as the frequency domain resource of the particular resource, or a ratio WO in $A_i$, $B_i$, $C_i$, $D_i$, or $E_i$ may be configured as the frequency domain resource of the particular resource, or a ratio $\alpha_i$ in $A_i$-$B_i$, $A_i$-$D_i$, or $A_i$-$E_i$ may be configured as the frequency domain resource of the particular resource, or a ratio $(1-\alpha_i)$ in $A_i$-$B_i$, $A_i$-$D_i$, or $A_i$-$E_i$ may be configured as the frequency domain resource of the particular resource, where i=0, ..., m−1 or i=1, ..., m−1.

2. NB-IoT Carrier Dimension

In the NB-IoT carrier dimension, in addition to the offset parameter and the scale factor, the parameter may be a bitmap.

Offset Parameter:

The offset parameter may be an offset relative to an NB-IoT carrier index. For example, the NB-IoT configures m NB-IoT carriers, to initiate random access. The carrier indexes are 0, 1, ..., and m−1, and a relative offset may be an offset relative to an NB-IoT carrier index 0, an offset relative to an NB-IoT carrier index 1, or the like.

Scale Factor:

It is assumed that the scale factor is β, and the carrier index is I, where I is an integer, and 0≤I≤m−1. An NB-IoT carrier satisfying 0≤I≤⌊βm⌋−1, ⌊βm⌋≤I≤m−1, 0≤I≤(1−β)m⌋−1, ⌊(1−β)m⌋≤I≤m−1, 0≤I≤⌈βm⌉−1, ⌈βm⌉≤I≤m−1, 0≤I≤⌈(1−β)m⌉−1, or ⌈(1−βm⌉≤I≤m−1 is used to send the scheduling request. Alternatively, I is a positive integer, and 1≤I≤m−1. An NB-IoT carrier satisfying 1≤I≤⌊βm⌋−1, ⌊βm⌋≤I≤m−1, 1≤I≤⌊(1−β)m⌋−1, ⌊(1−β)m⌋≤I≤m−1, 1≤I≤⌈βm⌉−1, ⌈βm⌉≤I≤m−1, 1≤I≤⌈(1−β)m⌉−1, or ⌈(1−β)m⌉≤I≤m−1 is used to send the scheduling request.

Bitmap:

It is assumed that a bitmap having a length of m is used for representation. In the bitmap, bits are in a one to one correspondence with NB-IoT carrier indexes. A lower bit indicates a minimum index number, or a higher bit indicates a minimum index number. Alternatively, arrangement is performed according to another preset rule. This application imposes no specific limitation. The network device and the terminal device use a same preset arrangement rule. In the bitmap, a bit location 0 indicates that a corresponding NB-IoT carrier is configured as the frequency domain resource of the particular resource or the bit location 1 indicates that a corresponding NB-IoT carrier is configured as the frequency domain resource of the particular resource, and a quantity of bits 0 or bits 1 indicates a quantity of NB-IoT carriers configured as the particular resource. Assuming that the NB-IoT supports 16 NB-IoT carriers, a 16-bit bitmap may be used to configure or indicate the frequency domain resource of the particular resource. The bit location 1 in the bitmap indicates that a corresponding NB-IoT carrier is configured as the frequency domain resource of the particular resource, and a lower bit corresponds to a minimum index number. In this case, in a bitmap 1100100010100001, it represents that six NB-IoT carriers are configured as frequency domain resources of the particular resource.

A specific example in which the offset parameter is used as the parameter in the fifth case is provided below.

It is assumed that the first offset parameter indicated in the system message of the network device, that is, the offset parameter in the NB-IoT carrier dimension, is $F_1$, and the second offset parameter indicated in the system message of the network device, that is, the offset parameter in the subcarrier dimension, is $F_2$, where $F_1$ represents that the carrier location of the particular resource is obtained by offsetting $F_1$ NB-IoT carriers based on an NB-IoT carrier whose index is 0 in the NPRACH resource, and $F_2$ represents that the start subcarrier location of the particular resource is obtained by offsetting $F_2$ subcarriers based on a start subcarrier location in $A_i$ in the NPRACH resource.

When the network device sends the configuration information to the terminal device, a carrier index calculated based on $F_1$ and a subcarrier index calculated based on $F_2$ may be sent to the terminal device.

In addition, in this manner, a time domain resource of the particular resource may be represented by introducing a bitmap into an NPRACH time domain resource. For example, a bit in the bitmap may be used to represent a symbol granularity, a timeslot granularity, a subframe granularity, an NPRACH period granularity, or the like. A bit 1 indicates that a corresponding symbol, timeslot, subframe, or NPRACH period is used as the time domain resource of the particular resource, and a bit 0 indicates that a corresponding symbol, timeslot, subframe, or NPRACH period is not used as the time domain resource of the particular resource. This is merely an example herein, and a meaning corresponding to the bit 0 or 1 may be opposite to that in the foregoing example.

Third Manner:

The network device directly indicates, by using the system message, a resource set that may be used as the first resource, without depending on the NPRACH resource, and the network device may indicate a configuration parameter of the first resource in the system message, including a quantity of carriers, a quantity of subcarriers, a frequency domain location of a start subcarrier, and the like.

In the method, the network device may flexibly indicate a resource set that may be used as the first resource, without re-using an existing NPRACH resource. Therefore, resources can be more flexibly allocated.

The foregoing listed some optional implementations for determining the particular resource, in a specific implementation process, the first resource may be configured by selecting any one or a combination of the foregoing implementations based on a requirement. The determined particular resource may be the NPRACH resource, the subset of the NPRACH resource, the resource that is in the NPRACH resource and that is different from the resource used for the contention-based random access, a subset of the resource that is in the NPRACH resource and that is different from the resource used for the contention-based random access, or a resource different from the NPRACH resource.

The following describes a method for notifying, by the terminal device, the network device of an uplink data amount.

In step S304 shown in FIG. 3, the terminal device sends the scheduling request to the network device on the first resource, to request the network device to allocate the uplink channel resource. In addition, the terminal device needs to notify the network device of a volume of uplink data that needs to be transmitted, so that the network device properly allocates the uplink channel resource based on the information. In an optional implementation, the terminal device may send, to the network device after step S304, a message used to notify the network device of the volume of the uplink data. In another optional implementation, the terminal device may implicitly add information about the uplink data amount when sending the scheduling request in step S304, and then the network device determines data amount information of to-be-transmitted uplink data based on the scheduling request. In the second manner, a process of separately reporting, by the terminal device, the uplink data amount to the network device may be omitted. Therefore, wireless transmission resources can be saved. The following mainly describes a specific implementation process of the second manner.

In the second manner, the terminal device adds the data amount information of the to-be-transmitted uplink data when sending the scheduling request to the network device. The network device determines the data amount information of the to-be-transmitted uplink data based on the scheduling request.

Specifically, the foregoing two methods may be used for implementation:

(1) The data amount information of the to-be-transmitted uplink data is implicitly carried by using a resource type.

The terminal device adds the data amount information of the to-be-transmitted uplink data when sending the scheduling request to the network device by using the first resource. The network device determines the data amount information of the to-be-transmitted uplink data based on the first resource corresponding to the received scheduling request.

The first resource includes a time domain resource, a frequency domain resource, a code resource, or a combination of a time domain resource, a frequency domain resource, and a code resource. The time domain resource, the frequency domain resource, the code resource, or the combination of the time domain resource, the frequency domain resource, and the code resource has a preset correspondence with the data amount information of the to-be-transmitted uplink data.

Specifically, a time domain resource corresponding to the first resource corresponds to a moment, a frequency domain resource corresponds to a frequency domain location, a code resource corresponds to an orthogonal code, or a combination of a time domain resource, a frequency domain resource, and a code resource corresponds to the data amount information of the to-be-transmitted uplink data.

For example, for the time domain resource, the terminal device determines, based on coverage level information indicated in the first resource configuration message, a period and a start time point for sending the scheduling request, and the period for sending the scheduling request by the terminal device is an odd period or an even period, indicating an amount of transmitted information.

For the frequency domain resource, the first resource configuration message includes a plurality of carrier indexes, and a start subcarrier location or index used when the terminal device sends the scheduling request has a preset correspondence with the data amount information of the to-be-transmitted uplink data; or the first resource configuration message includes a plurality of start subcarrier indexes, and a start subcarrier location or index used when the terminal device sends the scheduling request has a preset correspondence with the data amount information of the to-be-transmitted uplink data; or the first resource configuration message includes a plurality of carrier indexes and a plurality of start subcarrier indexes, and a carrier location or start subcarrier location used when the terminal device sends the scheduling request has a preset correspondence with the data amount information of the to-be-transmitted uplink data; or the first resource configuration message includes a plurality of carrier indexes and a plurality of start subcarrier indexes, and a carrier index or start subcarrier index used when the terminal device sends the scheduling request has a preset correspondence with the data amount information of the to-be-transmitted uplink data.

For the code resource, the first resource configuration message includes a plurality of orthogonal codes, and an orthogonal code or orthogonal code index used when the terminal device sends the scheduling request has a preset correspondence with the data amount information of the to-be-transmitted uplink data.

A combination of the time domain resource and the frequency domain resource, a combination of the frequency domain resource and the code resource, a combination of the time domain resource and the code resource, or a combination of the time domain resource, the frequency domain resource, and the code resource has a preset correspondence with the data amount information of the to-be-transmitted uplink data.

(2) The data amount information of the to-be-transmitted uplink data is implicitly carried by sending the scheduling request with delay or in advance.

In an optional implementation, a signal used by the terminal device to send the scheduling request may be an NPRACH preamble.

Figure 5:
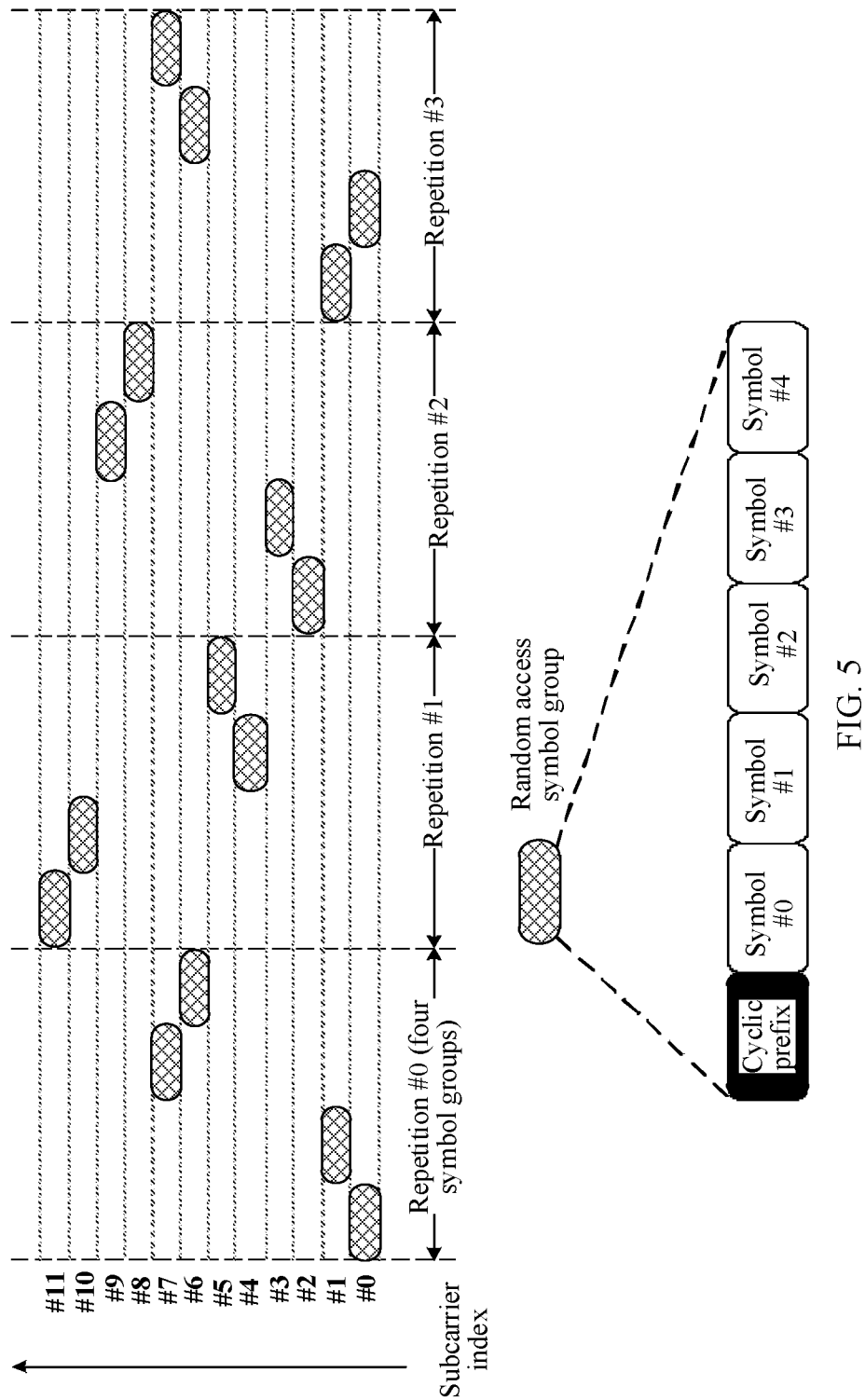
FIG. 5 is a schematic diagram of an NB-IoT random access preamble.

FIG. 5 is a schematic diagram of an NB-IoT random access preamble. As shown in FIG. 5, the NB-IoT random access preamble includes single-subcarrier frequency-hopping symbol groups. One preamble includes four symbol groups, and each symbol group includes one cyclic prefix and five symbols. The five symbols have same duration, namely, 8192 $T_s$, where $T_s$ is a time unit and satisfies $T_s=1/(15000\times2048)$ seconds, and duration of one cyclic prefix may be the same as or different from duration of one symbol. During actual transmission, the preamble may be repeated for a plurality of times based on a quantity of repetitions of a network configuration.

A frequency-domain frequency hopping range of the NPRACH preamble is within 12 subcarriers. A bandwidth of one NB-IoT carrier is 180 kilohertz (kHz), one NPRACH preamble occupies one subcarrier, and a subcarrier bandwidth is 3.75 kHz. Therefore, one NB-IoT carrier can support a maximum of 180/3.75=48 NPRACH preambles.

In an optional implementation, the signal used by the terminal device to send the scheduling request may be an NPRACH preamble or a new sequence having a structure similar to that of an NPRACH preamble. That is, the sequence also includes single-subcarrier frequency-hopping symbol groups. One preamble includes four symbol groups, and each symbol group includes one cyclic prefix and five symbols. The five symbols have same duration, namely, 8192 $T_s$, where $T_s$ is a time unit and satisfies $T_s=1/(15000\times 2048)$ seconds, and duration of one cyclic prefix may be the same as or different from duration of a cyclic prefix of the NPRACH preamble. A frequency-domain frequency hopping range of the sequence is within 12 subcarriers.

In this embodiment, a sequence used by the terminal device to send the scheduling request may be an NB-IoT random access preamble sequence. In addition, before the scheduling request is sent, the terminal device has performed TA adjustment.

Further, when sending the scheduling request on the first resource by using the NB-IoT random access preamble sequence, the terminal device may send the scheduling request on the first resource with delay or in advance. An amount of delay time or an amount of TA corresponding to the sent scheduling request has a preset correspondence with the data amount information of the to-be-transmitted uplink data. The network device determines the data amount information of the to-be-transmitted uplink data based on the amount of delay time or the amount of TA corresponding to the scheduling request received on the first resource.

Figure 6:
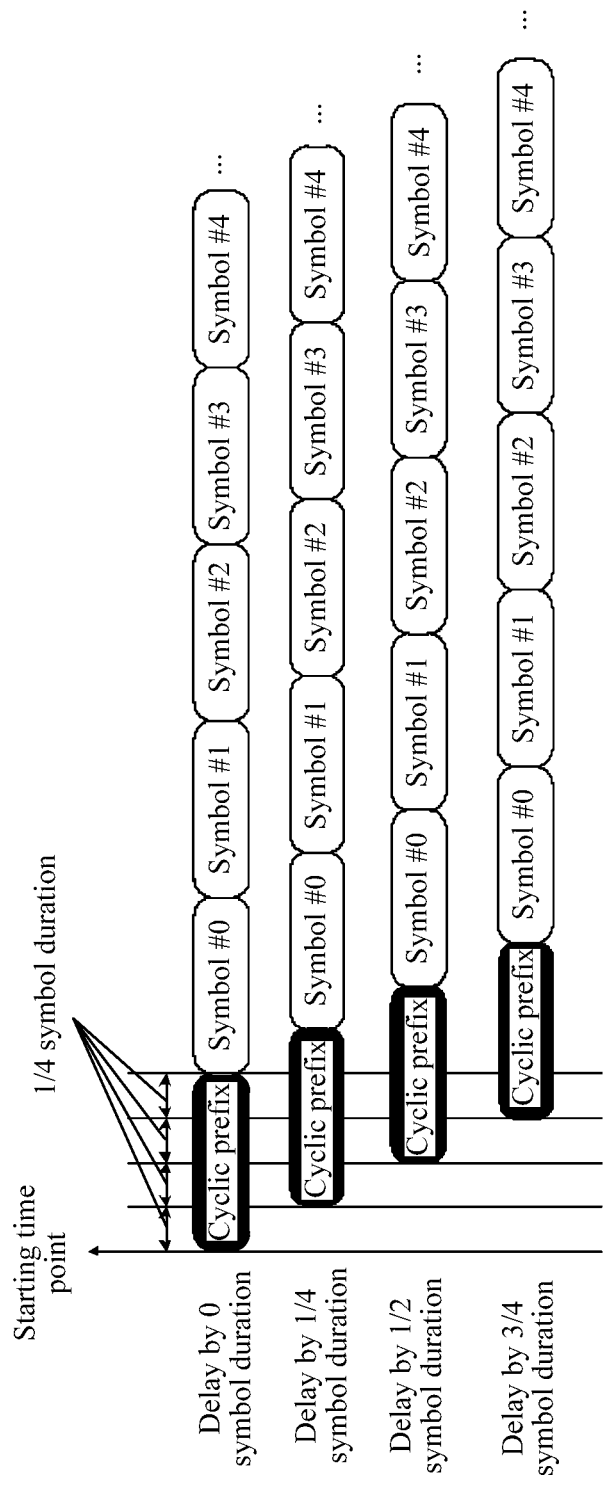
FIG. 6 is a diagram of an example in which an NB-IoT random access preamble sequence is sent with delay to indicate transmitted data information.

For example, FIG. 6 is a diagram of an example in which an NB-IoT random access preamble sequence is sent with delay to indicate transmitted data information. As shown in FIG. 6, the terminal device may send a preamble sequence by respectively delaying by 0 symbol duration, ¼ symbol duration, ½ symbol duration, and ¾ symbol duration, to indicate a data amount range of one piece of to-be-transmitted uplink data. Herein, the symbol duration is the same as duration of one symbol in the NPRACH preamble, namely, 8192 $T_s$, where $T_s$ is a time unit and satisfies $T_s=1/(15000\times2048)$ seconds.

It is assumed that a correspondence between a delayed symbol and the data amount range of the to-be-transmitted uplink data is shown in Table 1. In this case, after the terminal device sends the scheduling request to the network device on the first resource by delaying ¼ symbol duration, if the network device detects that the scheduling request is delayed by ¼ symbol duration, the network device can determine that a length of uplink data needing to be sent by the terminal device is greater than 10 bytes and is less than or equal to 12 bytes. In this case, the network device may allocate, to the terminal device, an uplink channel resource corresponding to data whose length is greater than 10 bytes and is less than or equal to 12 bytes.

TABLE 1

| Delayed symbol | Data amount range of to-be-transmitted uplink data (byte) |
|---|---|
| 0 symbol duration | 0 < Data amount of the to-be-transmitted uplink data ≤ 10 |
| ¼ symbol duration | 10 < Data amount of the to-be-transmitted uplink data ≤ 12 |
| ½ symbol duration | 12 < Data amount of the to-be-transmitted uplink data ≤ 14 |
| ¾ symbol duration | 14 < Data amount of the to-be-transmitted uplink data ≤ 17 |

It should be noted that FIG. 6 shows only one symbol group of the preamble sequence, and a delay policy of another symbol group is similar.

Figure 7:
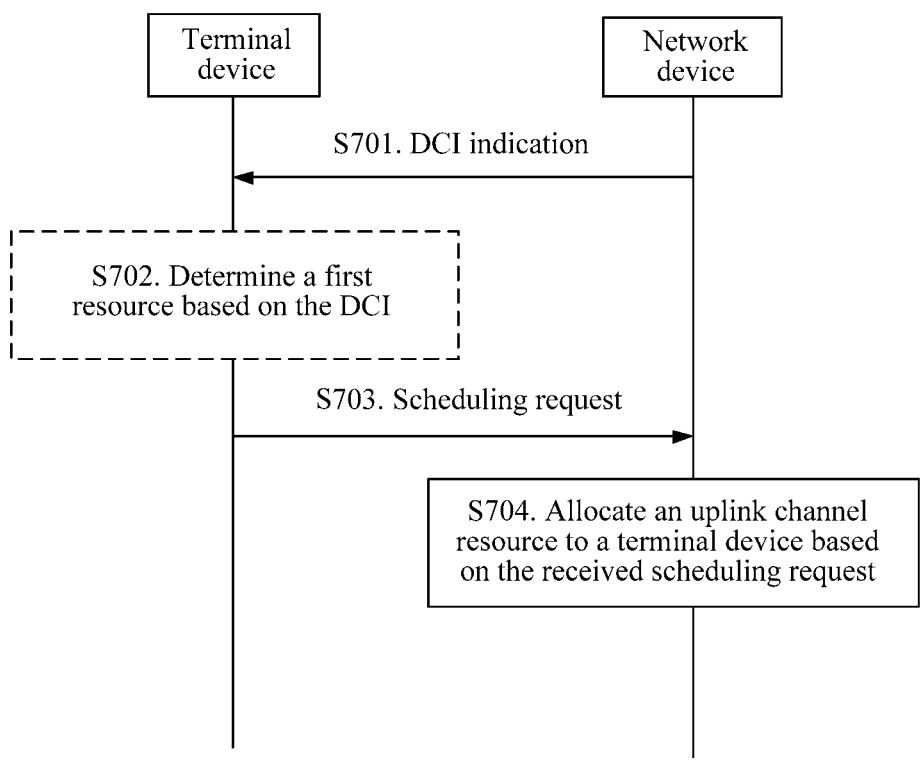
FIG. 7 is an interaction flowchart of Embodiment 2 of a resource scheduling method according to this application.

FIG. 7 is an interaction flowchart of Embodiment 2 of a resource scheduling method according to this application. An application scenario of the embodiment is: During scheduling of uplink transmission by a network device, uplink data arrives at a terminal device. As shown in FIG. 7, another execution process of the method is as follows:

S701. The terminal device receives a DCI indication sent by the network device.

The DCI is used to indicate a first resource, and the first resource is a time-frequency resource for NPUSCH format 2 transmission. In addition, the first resource is used by the terminal device to send a scheduling request.

In an NB-IoT system, uplink physical channels include an NPRACH and an NPUSCH.

The NPUSCH includes an NPUSCH format 1 and an NPUSCH format 2. The NPUSCH format 1 is used to transmit uplink data, and the NPUSCH format 2 is used to bear downlink HARQ-ACK feedback information.

In this embodiment, an NPUSCH format 2 resource is used as the first resource.

S702. The terminal device determines the first resource based on the DCI.

This step is an optional step.

S702. When uplink data arrives at the terminal device, the terminal device sends the scheduling request to the network device on the first resource indicated by the DCI.

Further, the network device receives and detects, on the first resource, the scheduling request sent by the terminal device. Provided that the network device detects, on the first resource, the scheduling request sent by the terminal device, the network device allocates the uplink channel resource to the terminal device. Otherwise, the network device performs a corresponding hybrid automatic repeat request (HARQ) operation based only on detected HARQ-ACK feedback information.

In this embodiment, the terminal device sends the scheduling request to the network device on the first resource, where the first resource is a time-frequency resource for NPUSCH format 2 transmission. That is, the terminal device can use the NPUSCH format 2 to send the scheduling request, thereby reducing resources specially used for the scheduling request.

Based on the embodiment, this embodiment relates to a specific method for sending the scheduling request by the terminal device by using the NPUSCH format 2 resource.

In an optional implementation, the terminal device may transmit both the scheduling request and the HARQ-ACK feedback information on the first resource through higher order modulation. In the HARQ-ACK feedback information, an ACK indicates positive acknowledgement, and an NACK indicates negative acknowledgement.

Optionally, the terminal device may perform quadrature phase shift keying (QPSK) modulation based on to-be-sent information. For example, modulation to 00 indicates that only an ACK is sent, modulation to 01 indicates that both an ACK and the scheduling request are sent, and modulation to 11 indicates that only an NACK is sent, and modulation to 10 indicates that both an NACK and the scheduling request are sent.

In another optional implementation, the terminal device may alternatively perform phase rotation on a modulation symbol corresponding to the HARQ-ACK feedback message, to transmit both the scheduling request and the HARQ-ACK feedback information on the first resource.

Optionally, a constellation point of the modulation symbol for the HARQ-ACK feedback information plus phase rotation of n/2 indicates that both an ACK and the scheduling request are sent, and a constellation point of the modulation symbol of NACK plus phase rotation of n/2 indicates both an NACK and the scheduling request are sent.

In another optional implementation, the terminal device may alternatively multiply a modulation symbol or an encoded bit corresponding to the HARQ-ACK feedback information by preset orthogonal codes, to transmit both the scheduling request and the HARQ-ACK feedback information on the first resource.

Optionally, for example, encoded HARQ-ACK feedback information is a code word having a length of 16 in the NB-IoT. Information bits 1 for an ACK are encoded into sixteen 1, and information bits 0 for an NACK are encoded into sixteen 0. The encoded bits of the ACK are multiplied by a sub-sequence of a Hadamard sequence having a length of 16, for example, {1, −1, 1, −1, 1, −1, 1, −1, 1, −1, 1, −1, 1, −1, 1, −1}, to transmit both the ACK and the scheduling request. That is, if codes received by the network device are sixteen 1 s, it indicates that only an ACK is transmitted. If codes received by the network device are sixteen 0s, it indicates that only an NACK is transmitted. If a network detects an orthogonal code sequence {1, −1, 1, −1, 1, −1, 1, −1, 1, −1, 1, −1, 1, −1, 1, −1}, it indicates that both an ACK and the scheduling request are transmitted.

In another optional implementation, the terminal device determines a first transmission sequence based on the HARQ-ACK feedback information and a preset orthogonal sequence, and transmits the first transmission sequence on the first resource, where the first transmission sequence is used to carry both the HARQ-ACK feedback information and scheduling request information.

The terminal device transmits the HARQ-ACK feedback information and the scheduling request based on a modulation symbol corresponding to a HARQ-ACK and the preset orthogonal sequence, so that the network device receiving the information only needs to directly perform coherent combination to complete sequence detection, without performing a complex decoding operation when detecting whether there is a scheduling request, thereby reducing detection complexity.

Optionally, the preset orthogonal sequence is at least one orthogonal sequence. For example, the preset orthogonal sequence may be two sequences, or may be one sequence. The following separately describes methods for determining a transmission sequence by a terminal in these two cases.

1. The preset orthogonal sequence is two sequences.

Specifically, the preset orthogonal sequence may be a first orthogonal sequence or a second orthogonal sequence, where the first orthogonal sequence is used when there is no scheduling request to be transmitted, and the second orthogonal sequence is used when there is a scheduling request to be transmitted.

The orthogonal sequence has good mutual correlation, so that a state in which there is a scheduling request and a state in which there is no scheduling request can be effectively distinguished.

Specifically, when there is no scheduling request to be transmitted and the HARQ-ACK feedback information is an ACK, the terminal device determines a sequence of complex symbols based on a modulation symbol corresponding to the ACK and the first orthogonal sequence, where the sequence of complex symbols is obtained by multiplying the modulation symbol corresponding to the ACK by each element in the first orthogonal sequence. Correspondingly, the terminal device transmits the sequence of complex symbols on a location of a time-frequency resource that is in the first resource and that is different from a resource occupied by an uplink reference signal.

When there is no scheduling request to be transmitted and the HARQ-ACK feedback information is an NACK, the terminal device determines a sequence of complex symbols based on a modulation symbol corresponding to the NACK and the first orthogonal sequence, where the sequence of complex symbols is obtained by multiplying the modulation symbol corresponding to the NACK by each element in the first orthogonal sequence. Correspondingly, the terminal device transmits the sequence of complex symbols on a location of a time-frequency resource that is in the first resource and that is different from a resource occupied by an uplink reference signal.

When there is a scheduling request to be transmitted and the HARQ-ACK feedback information is an ACK, the terminal device determines a sequence of complex symbols based on a modulation symbol corresponding to the ACK and the second orthogonal sequence, where the sequence of complex symbols is obtained by multiplying the modulation symbol corresponding to the ACK by each element in the second orthogonal sequence. Correspondingly, the terminal device transmits the sequence of complex symbols on a location of a time-frequency resource that is in the first resource and that is different from a resource occupied by an uplink reference signal.

When there is a scheduling request to be transmitted and the HARQ-ACK feedback information is an NACK, the terminal device determines a sequence of complex symbols based on a modulation symbol corresponding to the NACK and the second orthogonal sequence, where the sequence of complex symbols is obtained by multiplying the modulation symbol corresponding to the NACK by each element in the second orthogonal sequence. Correspondingly, the terminal device transmits the sequence of complex symbols on a location of a time-frequency resource that is in the first resource and that is different from a resource occupied by an uplink reference signal.

Optionally, the first orthogonal sequence and the second orthogonal sequence have a same quantity of elements. For example, the first orthogonal sequence and the second orthogonal sequence each have N elements, where N is a positive integer. Elements in the first orthogonal sequence are denoted as $a_k$, and elements in the second orthogonal sequence are denoted as $b_k$, where k=0, 1, 2, . . . , N−1. The first orthogonal sequence and the second orthogonal sequence are mutually orthogonal, that is, $$\sum_{k=0}^{N-1} a_k b_k = 0$$

is satisfied. The quantity of the elements in the first orthogonal sequence is the same as a quantity of modulation symbols corresponding to an ACK. In addition, the quantity of the elements in the first orthogonal sequence is the same as a quantity of modulation symbols corresponding to an NACK. Modulation symbols corresponding to an ACK may be modulation symbols corresponding to an ACK within one repetition cycle, and modulation symbols corresponding to an NACK may also be modulation symbols corresponding to an NACK within one repetition cycle. Alternatively, modulation symbols corresponding to an ACK may be modulation symbols corresponding to an ACK within all repetition cycles, and modulation symbols corresponding to an NACK may also be modulation symbols corresponding to an NACK within all the repetition cycles.

The NB-IoT system is used as an example. In each repetition cycle, the HARQ-ACK feedback information is encoded and modulated to obtain a modulation symbol having a length of 16. The first orthogonal sequence and the second orthogonal sequence may be any two different rows or columns in a 16-order Hadamard matrix. The 16-order Hadamard matrix is shown in Table 2. For example, the first orthogonal sequence may be {1, 1, 1, 1, 1, 1, 1, 1, 1, 1, 1, 1, 1, 1, 1, 1}, and the second orthogonal sequence may be {1, −1, 1, −1, 1, −1, 1, −1, 1, −1, 1, −1, 1, −1, 1, −1}. Alternatively, the first orthogonal sequence may be {1, 1, 1, 1, 1, 1, 1, 1, 1, 1, 1, 1, 1, 1, 1, 1}, and the second orthogonal sequence may be {1, 1, 1, 1, 1, 1, 1, 1, −1, −1, −1, −1, −1, −1, −1, −1}. Alternatively, the first orthogonal sequence may be {1, 1, 1, 1, 1, 1, 1, 1, 1, 1, 1, 1, 1, 1, 1, 1}, and the second orthogonal sequence may be {1, j, −1, −j, 1, j, −1, −j, 1, j, −1, −j, 1, j, −1, −j}, where j is an imaginary unit, and satisfies $j^2=-1$. Alternatively, the first orthogonal sequence may be {1, 1, 1, 1, 1, 1, 1, 1, 1, 1, 1, 1, 1, 1, 1, 1}, and the second orthogonal sequence may be {j, −j, j, −j, j, −j, j, −j, j, −j, j, −j, j, −j, j, −j}, where j is an imaginary unit, and satisfies $j^2=1$.

2. The preset orthogonal sequence is one sequence.

Specifically, the preset orthogonal sequence is a third orthogonal sequence, and the third orthogonal sequence is used when there is a scheduling request to be transmitted.

The HARQ-ACK feedback information implicitly carries a full "1" sequence. Therefore, one orthogonal sequence may be used to achieve a same technical effect. In addition, a quantity of sequence detections can be reduced, thereby reducing complexity and power consumption Specifically, when there is no scheduling request to be transmitted, the terminal device transmits the HARQ-ACK feedback information on the first resource. For a specific method, refer to a processing method in the prior art, and details are not described herein.

When there is a scheduling request to be transmitted and the HARQ-ACK feedback information is an ACK, the terminal device determines a sequence of complex symbols based on a modulation symbol corresponding to the ACK and the third orthogonal sequence, where the sequence of complex symbols is obtained by multiplying the modulation symbol corresponding to the ACK by each element in the third orthogonal sequence. The terminal device transmits the sequence of complex symbols on a location of a time-frequency resource that is in the first resource and that is different from a resource occupied by an uplink reference signal.

When there is a scheduling request to be transmitted and the HARQ-ACK feedback information is an NACK, the terminal device determines a sequence of complex symbols based on a modulation symbol corresponding to the NACK and the third orthogonal sequence, where the sequence of complex symbols is obtained by multiplying the modulation symbol corresponding to the NACK by each element in the third orthogonal sequence. The terminal device transmits the sequence of complex symbols on a location of a time-frequency resource that is in the first resource and that is different from a resource occupied by an uplink reference signal.

A quantity of elements in the third orthogonal sequence is denoted as W, where W is a positive integer. Elements in the third orthogonal sequence are denoted as $c_k$, where k=0, 1, 2, ..., W−1. The third orthogonal sequence satisfies $$\sum_{k=0}^{N-1} c_k = 0.$$

Optionally, the quantity of the elements in the third orthogonal sequence is the same as a quantity of modulation symbols corresponding to an ACK. In addition, the quantity of the elements in the third orthogonal sequence is the same as a quantity of modulation symbols corresponding to an NACK. Modulation symbols corresponding to an ACK may be modulation symbols corresponding to an ACK within one repetition cycle, and modulation symbols corresponding to an NACK may also be modulation symbols corresponding to an NACK within one repetition cycle. Alternatively, modulation symbols corresponding to an ACK may be modulation symbols corresponding to an ACK within all repetition cycles, and modulation symbols corresponding to an NACK may also be modulation symbols corresponding to an NACK within all the repetition cycles.

The NB-IoT is used as an example. In each repetition cycle, the HARQ-ACK feedback information is encoded and modulated to obtain a modulation symbol having a length of 16. The third orthogonal sequence may be a row or a column in a 16-order Hadamard matrix. The 16-order Hadamard matrix is shown in Table 2. For example, the third orthogonal sequence may be {1, −1, 1, −1, 1, −1, 1, −1, 1, −1, 1, −1, 1, −1, 1, −1}. Alternatively, the third orthogonal sequence may be {1, 1, 1, 1, 1, 1, 1, 1, −1, −1, −1, −1, −1, −1, −1, −1}. Alternatively, the third orthogonal sequence may be {1, j, −1, −j, 1, j, −1, −j, 1, j, −1, −j, 1, j, −1 j}, where j is an imaginary unit and satisfies $j^2$=−1. Alternatively, the third orthogonal sequence may be {j, −j, j, −j, j, −j, j, −j, j, −j, j, −j, j, −j, j, −j}, where j is an imaginary unit and satisfies $j^2$=−1.

TABLE 2

| 1 | 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|
| 1 | −1 | 1 | −1 | 1 | −1 | 1 | −1 | 1 | −1 | 1 | −1 | 1 | −1 | 1 | −1 |
| 1 | 1 | −1 | −1 | 1 | 1 | −1 | −1 | 1 | 1 | −1 | −1 | 1 | 1 | −1 | −1 |
| 1 | −1 | −1 | 1 | 1 | −1 | −1 | 1 | 1 | −1 | −1 | 1 | 1 | −1 | −1 | 1 |
| 1 | 1 | 1 | 1 | −1 | −1 | −1 | −1 | 1 | 1 | 1 | 1 | −1 | −1 | −1 | −1 |
| 1 | −1 | 1 | −1 | −1 | 1 | −1 | 1 | 1 | −1 | 1 | −1 | −1 | 1 | −1 | 11 |
| 1 | 1 | −1 | −1 | −1 | −1 | 1 | 1 | 1 | 1 | −1 | −1 | −1 | −1 | 1 | 1 |
| 1 | −1 | −1 | 1 | −1 | 1 | 1 | −1 | 1 | −1 | −1 | 1 | −1 | 1 | 1 | −1 |
| 1 | 1 | 1 | 1 | 1 | 1 | 1 | 1 | −1 | −1 | −1 | −1 | −1 | −1 | −1 | −1 |
| 1 | −1 | 1 | −1 | 1 | −1 | 1 | −1 | −1 | 1 | −1 | 1 | −1 | 1 | −1 | 1 |
| 1 | 1 | −1 | −1 | 1 | 1 | −1 | −1 | −1 | −1 | 1 | 1 | −1 | −1 | 1 | 1 |
| 1 | −1 | −1 | 1 | 1 | −1 | −1 | 1 | −1 | 1 | 1 | −1 | −1 | 1 | 1 | −1 |
| 1 | 1 | 1 | 1 | −1 | −1 | −1 | −1 | −1 | −1 | −1 | −1 | 1 | 1 | 1 | 1 |
| 1 | −1 | 1 | −1 | −1 | 1 | −1 | 1 | −1 | 1 | −1 | 1 | 1 | −1 | 1 | −1 |
| 1 | 1 | −1 | −1 | −1 | −1 | 1 | 1 | −1 | −1 | 1 | 1 | 1 | 1 | −1 | −1 |
| 1 | −1 | −1 | 1 | −1 | 1 | 1 | −1 | −1 | 1 | 1 | −1 | 1 | −1 | −1 | 1 |

It should be noted that, the first orthogonal sequence, the second orthogonal sequence, and the third orthogonal sequence in this application are merely used to distinguish between names of the sequences, and have no actual meanings.

Further, the terminal device may further add data amount information of to-be-transmitted uplink data when transmitting the scheduling request in the foregoing several manners.

(1) Both the scheduling request and the HARQ-ACK feedback information are transmitted on the first resource through higher order modulation.

Optionally, the data amount information of the to-be-transmitted uplink data has a preset correspondence with a constellation point of the higher order modulation. The data amount information of the to-be-transmitted uplink data may be determined based on the constellation point of higher order modulation.

For example, based on QPSK modulation, assuming that an uplink transmission data amount is shown in Table 3, modulation to 00 indicates that only an ACK is sent, modulation to 01 indicates that both an ACK and a transmission data amount range corresponding to an index value 0 are sent, modulation to 11 indicates that only an NACK is sent, and modulation to 10 indicates that both an NACK and a transmission data amount range corresponding to an index value 1 are sent.

TABLE 3

| Index | Transmission data amount (byte) |
|---|---|
| 0 | 0 < Transmission data amount ≤ 32 |
| 1 | 32 < Transmission data amount ≤ 64 |

(2) Phase rotation is performed on a modulation symbol corresponding to the HARQ-ACK feedback message, to transmit both the scheduling request and the HARQ-ACK feedback information on the first resource.

Optionally, the data amount information of the to-be-transmitted uplink data has a preset correspondence with a magnitude of the phase rotation. The data amount information of the to-be-transmitted uplink data may be determined based on the magnitude of the phase rotation.

For example, assuming that an uplink transmission data amount is shown in Table 4, a constellation point of the modulation symbol for the HARQ-ACK feedback information plus phase rotation of $\pi/2$ indicates that both an ACK and a data amount range of to-be-transmitted uplink data corresponding to an index value 0 or an index value 0, and a constellation point of the modulation symbol for the hybrid automatic repeat request-negative acknowledgement (HARQ-NACK[FW1]) feedback information plus phase rotation of $\pi/2$ indicates that both an NACK and a data amount range of to-be-transmitted uplink data corresponding to an index value 1 or an index value are sent.

TABLE 4

| Index | Transmission data amount (byte) |
|---|---|
| 0 | 0 < Transmission data amount ≤ 32 |
| 1 | 32 < Transmission data amount ≤ 64 |

(3) A modulation symbol or an encoded bit corresponding to the HARQ-ACK feedback information is multiplied by preset orthogonal codes, to transmit both the scheduling request and the HARQ-ACK feedback information on the first resource.

Optionally, the preset orthogonal codes are a Hadamard sequence having a length of 16.

Optionally, the data amount information of the to-be-transmitted uplink data has a preset correspondence with the preset orthogonal codes. The data amount information of the to-be-transmitted uplink data may be determined based on the preset orthogonal codes.

For example, the Hadamard sequence having the length of 16 is shown in Table 5. An ACK or an NACK may be multiplied by the Hadamard sequence having the length of 16, to indicate a data amount range of the to-be-transmitted uplink data.

TABLE 5

| Index | Hadamard sequence | Data amount of to-be-transmitted uplink data (byte) |
|---|---|---|
| 0 | 1 -1 1 -1 1 -1 1 -1 1 -1 1 -1 1 -1 1 -1 | Data amount of the to-be-transmitted up link data = 0 |
| 1 | 1 1 -1 -1 1 1 -1 -1 1 1 -1 -1 1 1 -1 -1 | 0 < Data amount of the to-be-transmitted uplink data ≤ 10 |
| 2 | 1 -1 -1 1 1 -1 -1 1 1 -1 -1 1 1 -1 -1 1 1 | 10 < Data amount of the to-be-transmitted uplink data ≤ 12 |
| 3 | 1 1 1 1 -1 -1 -1 -1 1 1 1 1 -1 -1 -1 -1 | 12 < Data amount of the to-be-transmitted uplink data ≤ 14 |
| 4 | 1 -1 1 -1 -1 1 -1 1 1 -1 1 -1 -1 1 -1 1 | 14 < Data amount of the to-be-transmitted uplink data ≤ 17 |
| 5 | 1 1 -1 -1 -1 -1 1 1 1 1 -1 -1 -1 -1 1 1 | 17 < Data amount of the to-be-transmitted uplink data ≤ 19 |
| 6 | 1 -1 -1 1 -1 1 1 -1 1 -1 -1 1 -1 1 1 -1 | 19 < Data amount of the to-be-transmitted uplink data ≤ 22 |
| 7 | 1 1 1 1 1 1 1 1 -1 -1 -1 -1 -1 -1 -1 -1 | 22 < Data amount of the to-be-transmitted uplink data ≤ 26 |
| 8 | 1 -1 1 -1 1 -1 1 -1 -1 1 -1 1 -1 1 -1 1 | 26 < Data amount of the to-be-transmitted uplink data ≤ 31 |
| 9 | 1 1 -1 -1 1 1 -1 -1 -1 -1 1 1 -1 -1 1 1 | 31 < Data amount of the to-be-transmitted uplink data ≤ 36 |
| 10 | 1 -1 -1 1 1 -1 -1 1 -1 1 1 -1 -1 1 1 -1 | 36 < Data amount of the to-be-transmitted uplink data ≤ 42 |
| 11 | 1 1 1 1 -1 -1 -1 -1 -1 -1 -1 -1 1 1 1 1 | 42 < Data amount of the to-be-transmitted uplink data ≤ 49 |
| 12 | 1 -1 1 -1 -1 1 -1 1 -1 1 -1 1 1 -1 1 -1 | 49 < Data amount of the to-be-transmitted uplink data ≤ 57 |
| 13 | 1 1 -1 -1 -1 -1 1 1 -1 -1 1 1 1 1 -1 -1 | 57 < Data amount of the to-be-transmitted uplink data ≤ 67 |
| 14 | 1 -1 -1 1 -1 1 1 -1 -1 1 1 -1 1 -1 -1 1 | 67 < Data amount of the to-be-transmitted uplink data ≤ 78 |

Figure 8:
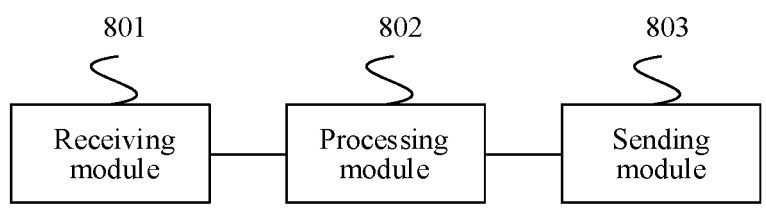
FIG. 8 is a structural block diagram of Embodiment 1 of a terminal device according to this application.

FIG. 8 is a structural block diagram of Embodiment 1 of a terminal device according to this application. As shown in FIG. 8, the terminal device includes:

a receiving module 801, configured to receive a configuration message sent by a network device;

a processing module 802, configured to obtain, based on the configuration information received by the receiving module 801, first resource configuration information used to send a scheduling request, where the first resource configuration information includes information used to indicate a coverage enhancement level; and a sending module 803, configured to send a scheduling request to the network device on a first resource indicated by the first resource configuration information obtained by the processing module 802, where the scheduling request is used to request an uplink channel resource from the network device, and the terminal device performs no random access process when sending the scheduling request.

The terminal device is configured to implement functions of the terminal device in the foregoing method embodiment 1. Their implementation principles and technical effects are similar, and details are not described herein again.

In another embodiment, the receiving module 801 is further configured to receive a system message sent by the network device.

The processing module 802 is further configured to obtain configuration information of an NPRACH resource based on the system message.

The NPRACH resource is a resource set of the first resource, or a subset of the NPRACH resource is a resource set of the first resource, or resources that are in the NPRACH resource and that are different from a resource used for contention-based random access are a resource set of the first resource, or a subset of resources that are in the NPRACH resource and that are different from a resource used for contention-based random access is a resource set of the first resource.

In another embodiment, the system message carries a first preset parameter and a second preset parameter.

A carrier location of the resource set of the first resource is determined based on a carrier location of the NPRACH resource and the first preset parameter, and a start subcarrier location of the resource set of the first resource is determined based on a start subcarrier location of the NPRACH resource and the second preset parameter; or a carrier location of the resource set of the first resource is determined based on a carrier location of the subset of the NPRACH resource and the first preset parameter, and a start subcarrier location of the resource set of the first resource is determined based on a start subcarrier location of the subset of the NPRACH resource and the second preset parameter.

Further, the system message carries a first offset parameter and a second offset parameter.

The carrier location of the resource set of the first resource is determined based on the carrier location of the NPRACH resource and the first offset parameter, and the start subcarrier location of the resource set of the first resource is determined based on the start subcarrier location of the NPRACH resource and the second offset parameter; or the carrier location of the resource set of the first resource is determined based on the carrier location of the subset of the NPRACH resource and the first offset parameter, and the start subcarrier location of the resource set of the first resource is determined based on the start subcarrier location of the subset of the NPRACH resource and the second offset parameter.

Further, the system message carries a first preset scale factor and a second preset scale factor.

The carrier location of the resource set of the first resource is determined based on the carrier location of the NPRACH resource and the first preset scale factor, and the start subcarrier location of the resource set of the first resource is determined based on the start subcarrier location of the NPRACH resource and the second preset scale factor; or the carrier location of the resource set of the first resource is determined based on the carrier location of the subset of the NPRACH resource and the first preset scale factor, and the start subcarrier location of the resource set of the first resource is determined based on the start subcarrier location of the subset of the NPRACH resource and the second preset scale factor.

In another embodiment, the sending module 803 is further configured to:

add data amount information of to-be-transmitted uplink data when sending the scheduling request to the network device.

Further, the sending module 803 is specifically configured to:

send the scheduling request to the network device on the first resource with delay or in advance, where an amount of delay time or an amount of TA corresponding to the scheduling request has a preset correspondence with the data amount information of the to-be-transmitted uplink data; or add the data amount information of the to-be-transmitted uplink data when sending the scheduling request to the network device on the first resource, where the first resource includes a time domain resource, a frequency domain resource, a code resource, or a combination of a time domain resource, a frequency domain resource, and a code resource, and the time domain resource, the frequency domain resource, the code resource, or the combination of the time domain resource, the frequency domain resource, and the code resource has a preset correspondence with the data amount information of the to-be-transmitted uplink data.

In another embodiment, a signal used by the terminal device to send the scheduling request is an NPRACH preamble, and the terminal device has performed TA adjustment before sending the scheduling request.

Figure 9:
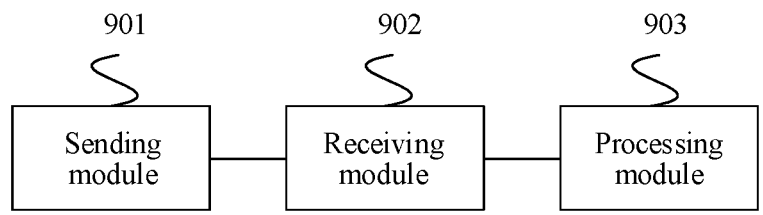
FIG. 9 is a structural block diagram of Embodiment 1 of a network device according to this application.

FIG. 9 is a structural block diagram of Embodiment 1 of a network device according to this application. As shown in FIG. 9, the network device includes:

a sending module 901, configured to send a configuration message to a terminal device, where the configuration message is used by the terminal device to obtain first resource configuration information used to send a scheduling request, and the first resource configuration information includes information used to indicate a coverage enhancement level;

a receiving module 902, configured to receive a scheduling request sent by the terminal device on a first resource indicated by the first resource configuration information, where the scheduling request is used to request an uplink channel resource from the network device, and the terminal device performs no random access process when sending the scheduling request; and a processing module 903, configured to allocate an uplink channel resource to the terminal device based on the scheduling request received by the receiving module 902.

The network device is configured to implement functions of the network device in the foregoing method embodiment 1. Their implementation principles and technical effects are similar, and details are not described herein again.

In another embodiment, the sending module 901 is further configured to: send a system message to the terminal device, where the system message carries configuration information of an NPRACH resource.

The NPRACH resource is a resource set of the first resource, or a subset of the NPRACH resource is a resource set of the first resource, or resources that are in the NPRACH resource and that are different from a resource used for contention-based random access are a resource set of the first resource, or a subset of resources that are in the NPRACH resource and that are different from a resource used for contention-based random access is a resource set of the first resource.

In another embodiment, the system message carries a first preset parameter and a second preset parameter.

A carrier location of the resource set of the first resource is determined based on a carrier location of the NPRACH resource and the first preset parameter, and a start subcarrier location of the resource set of the first resource is determined based on a start subcarrier location of the NPRACH resource and the second preset parameter; or a carrier location of the resource set of the first resource is determined based on a carrier location of the subset of the NPRACH resource and the first preset parameter, and a start subcarrier location of the resource set of the first resource is determined based on a start subcarrier location of the subset of the NPRACH resource and the second preset parameter.

Further, the system message carries a first offset parameter and a second offset parameter.

The carrier location of the resource set of the first resource is determined based on the carrier location of the NPRACH resource and the first offset parameter, and the start subcarrier location of the resource set of the first resource is determined based on the start subcarrier location of the NPRACH resource and the second offset parameter; or the carrier location of the resource set of the first resource is determined based on the carrier location of the subset of the NPRACH resource and the first offset parameter, and the start subcarrier location of the resource set of the first resource is determined based on the start subcarrier location of the subset of the NPRACH resource and the second offset parameter.

Further, the system message carries a first preset scale factor and a second preset scale factor.

The carrier location of the resource set of the first resource is determined based on the carrier location of the NPRACH resource and the first preset scale factor, and the start subcarrier location of the resource set of the first resource is determined based on the start subcarrier location of the NPRACH resource and the second preset scale factor; or the carrier location of the resource set of the first resource is determined based on the carrier location of the subset of the NPRACH resource and the first preset scale factor, and the start subcarrier location of the resource set of the first resource is determined based on the start subcarrier location of the subset of the NPRACH resource and the second preset scale factor.

In another embodiment, the processing module 903 is further configured to:

determine data amount information of to-be-transmitted uplink data based on the scheduling request sent by the terminal device.

Further, the processing module 903 is specifically configured to:

determine the data amount information of the to-be-transmitted uplink data based on an amount of delay time or an amount of TA corresponding to the scheduling request received on the first resource, where the amount of delay time or the amount of TA corresponding to the scheduling request has a preset correspondence with the data amount information of the to-be-transmitted uplink data; or determine the data amount information of the to-be-transmitted uplink data based on the first resource corresponding to the received scheduling request, where the first resource includes a time domain resource, a frequency domain resource, a code resource, or a combination of a time domain resource, a frequency domain resource, and a code resource, and the time domain resource, the frequency domain resource, the code resource, or the combination of the time domain resource, the frequency domain resource, and the code resource has a preset correspondence with the data amount information of the to-be-transmitted uplink data.

In another embodiment, a signal used by the network device to receive the scheduling request is an NPRACH preamble, and the terminal device has performed TA adjustment before sending the scheduling request.

Figure 10:
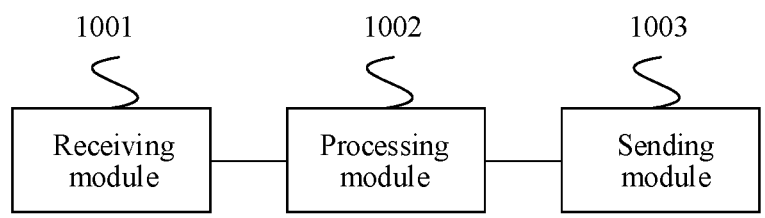
FIG. 10 is a structural block diagram of Embodiment 1 of another terminal device according to this application.

FIG. 10 is a structural block diagram of Embodiment 1 of another terminal device according to this application. As shown in FIG. 10, the terminal device includes:

a receiving module 1001, configured to receive a DCI indication sent by a network device, where the DCI is used to indicate a first resource, and the first resource is a time-frequency resource for NPUSCH format 2 transmission;

a processing module 1002, configured to determine the first resource based on the DCI; and a sending module 1003, configured to send a scheduling request to the network device on the first resource.

The apparatus is configured to implement functions of the terminal device in the foregoing method embodiment 2. Their implementation principles and technical effects are similar, and details are not described herein again.

In another embodiment, the sending module 1003 is specifically configured to:

transmit both the scheduling request and the HARQ-ACK feedback information on the first resource through higher order modulation.

In another embodiment, the sending module 1003 is further specifically configured to:

perform phase rotation on a modulation symbol corresponding to the HARQ-ACK feedback message, to transmit both the scheduling request and the HARQ-ACK feedback information on the first resource.

In another embodiment, the sending module 1003 is further specifically configured to:

multiply a modulation symbol or an encoded bit corresponding to the HARQ-ACK feedback information by preset orthogonal codes, to transmit both the scheduling request and the HARQ-ACK feedback information on the first resource.

Further, the preset orthogonal codes are a Hadamard sequence having a length of 16.

In another embodiment, the sending module 1003 is further configured to:

add data amount information of to-be-transmitted uplink data when sending the scheduling request to the network device.

Further, the data amount information of the to-be-transmitted uplink data has a preset correspondence with a constellation point of the higher order modulation.

Further, the data amount information of the to-be-transmitted uplink data has a preset correspondence with a magnitude of the phase rotation.

Further, the data amount information of the to-be-transmitted uplink data has a preset correspondence with a sequence of the preset orthogonal codes.

Figure 11:
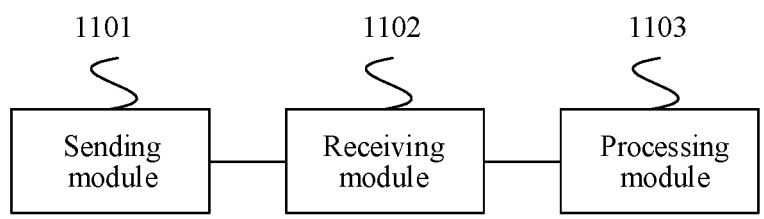
FIG. 11 is a structural block diagram of Embodiment 1 of another network device according to this application.

FIG. 11 is a structural block diagram of Embodiment 1 of another network device according to this application. As shown in FIG. 11, the network device includes:

a sending module 1101, configured to send a DCI indication to a terminal device, where the DCI is used to indicate a first resource, and the first resource is a time-frequency resource for NPUSCH format 2 transmission;

a receiving module 1102, configured to receive a scheduling request sent by the terminal device on the first resource; and a processing module 1103, configured to allocate an uplink channel resource to the terminal device based on the scheduling request.

The apparatus is configured to implement functions of the network device in the foregoing method embodiment 2. Their implementation principles and technical effects are similar, and details are not described herein again.

In another embodiment, the terminal device transmits both the scheduling request and the HARQ-ACK feedback information on the first resource through higher order modulation. The processing module 1103 is specifically configured to:

determine, based on a received signal obtained after the higher order modulation, whether the terminal device has sent the scheduling request.

In another embodiment, the terminal device performs phase rotation on a modulation symbol corresponding to the HARQ-ACK feedback message, to transmit both the scheduling request and the HARQ-ACK feedback information on the first resource. The processing module 1103 is further specifically configured to:

determine, based on the received modulation symbol that undergoes the phase rotation, whether the terminal device has sent the scheduling request.

In another embodiment, the terminal device multiplies a modulation symbol or an encoded bit corresponding to the HARQ-ACK feedback information by preset orthogonal codes, to transmit both the scheduling request and the HARQ-ACK feedback information on the first resource. The processing module 1103 is further specifically configured to:

determine, based on a received modulation symbol obtained after multiplication by the preset orthogonal codes, whether the terminal device has sent the scheduling request.

Further, the preset orthogonal codes are a Hadamard sequence having a length of 16.

In another embodiment, determine data amount information of to-be-transmitted uplink data based on the scheduling request sent by the terminal device.

Further, the data amount information of the to-be-transmitted uplink data has a preset correspondence with a constellation point of the higher order modulation.

Further, the data amount information of the to-be-transmitted uplink data has a preset correspondence with a magnitude of the phase rotation.

Further, the data amount information of the to-be-transmitted uplink data has a preset correspondence with a sequence of the preset orthogonal codes.

Figure 12:
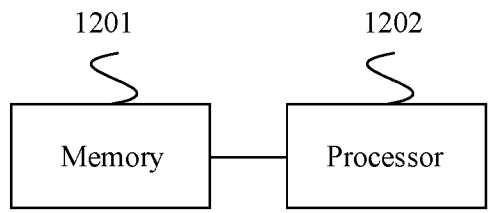
FIG. 12 is a physical block diagram of Embodiment 1 of a terminal device according to this application.

FIG. 12 is a physical block diagram of Embodiment 1 of a terminal device according to this application. As shown in FIG. 12, the terminal device includes:

a memory 1201 and a processor 1202.

The memory 1201 is configured to store a program instruction, and the processor 1202 is configured to invoke the program instruction in the memory 1201, to implement functions of the terminal device in the foregoing method embodiment 1.

Figure 13:
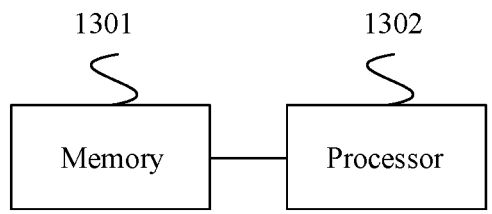
FIG. 13 is a physical block diagram of Embodiment 1 of a network device according to this application.

FIG. 13 is a physical block diagram of Embodiment 1 of a network device according to this application. As shown in FIG. 13, the network device includes:

a memory 1301 and a processor 1302.

The memory 1301 is configured to store a program instruction, and the processor 1302 is configured to invoke the program instruction in the memory 1301, to implement functions of the network device in the foregoing method embodiment 1.

Figure 14:
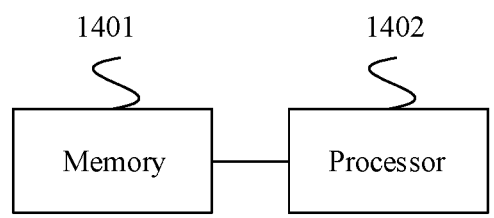
FIG. 14 is a physical block diagram of Embodiment 1 of another terminal device according to this application.

FIG. 14 is a physical block diagram of Embodiment 1 of another terminal device according to this application. As shown in FIG. 14, the terminal device includes:

a memory 1401 and a processor 1402.

The memory 1401 is configured to store a program instruction, and the processor 1402 is configured to invoke the program instruction in the memory 1401, to implement functions of the terminal device in the foregoing method embodiment 2.

Figure 15:
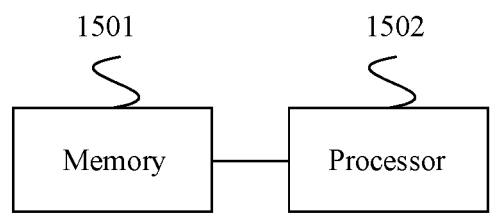
FIG. 15 is a physical block diagram of Embodiment 1 of another network device according to this application.

FIG. 15 is a physical block diagram of Embodiment 1 of another network device according to this application. As shown in FIG. 15, the network device includes:

a memory 1501 and a processor 1502.

The memory 1501 is configured to store a program instruction, and the processor 1502 is configured to invoke the program instruction in the memory 1501, to implement functions of the network device in the foregoing method embodiment 2.

What is claimed is:

1. A resource scheduling method, comprising:

receiving, by a terminal device, a downlink control information (DCI) from a network device, wherein the DCI is used to indicate a first resource, and the first resource is a time-frequency resource used to transmit a narrowband physical uplink shared channel (NPUSCH) format 2 transmission, and the NPUSCH format 2 transmission is used to carry downlink hybrid automatic repeat request-acknowledgment (HARQ-ACK) feedback information;

determining, by the terminal device, a first transmission sequence based on the HARQ-ACK feedback information and a preset orthogonal sequence, wherein the first transmission sequence is a sequence of complex symbols, wherein the sequence of complex symbols is obtained by multiplying a modulation symbol with each element in the preset orthogonal sequence, wherein the modulation symbol is determined based on the HARQ-ACK feedback information, wherein the preset orthogonal sequence is a first orthogonal sequence or a second orthogonal sequence different from the first orthogonal sequence, wherein the first orthogonal sequence is used when there is no scheduling request to be transmitted, and wherein the second orthogonal sequence is used when there is a scheduling request to be transmitted; and transmitting, by the terminal device, the first transmission sequence on the first resource, wherein the first transmission sequence is used to carry both the HARQ-ACK feedback information and scheduling request information.

2. The method according to claim 1, wherein:

the first orthogonal sequence is {1, 1, 1, 1, 1, 1, 1, 1, 1, 1, 1, 1, 1, 1, 1, 1};

or the second orthogonal sequence is {1, −1, 1, −1, 1, −1, 1, −1, 1, −1, 1, −1, 1, −1, 1, −1}.

3. A resource scheduling method, comprising:

sending, by a network device, a downlink control information (DCI) to a terminal device, wherein the DCI is used to indicate a first resource, and the first resource is a time-frequency resource for a narrowband physical uplink shared channel (NPUSCH) format 2 transmission, wherein the NPUSCH format 2 transmission is used to carry downlink hybrid automatic repeat request-acknowledgment (HARQ-ACK) feedback information; and receiving, by the network device on the first resource, a first transmission sequence from the terminal device, wherein the first transmission sequence is determined by the terminal device based on the HARQ-ACK feedback information and a preset orthogonal sequence, and wherein the first transmission sequence is used to carry both the HARQ-ACK feedback information and scheduling request information, wherein the first transmission sequence is a sequence of complex symbols, wherein the sequence of complex symbols is obtained by multiplying a modulation symbol with each element in the preset orthogonal sequence, wherein the modulation symbol is determined based on the HARQ-ACK feedback information, wherein the preset orthogonal sequence is a first orthogonal sequence or a second orthogonal sequence different from the first orthogonal sequence, wherein the first orthogonal sequence is used when there is no scheduling request to be transmitted, and wherein the second orthogonal sequence is used when there is a scheduling request to be transmitted.

4. The method according to claim 3, wherein the second orthogonal sequence is {1, −1, 1, −1, 1, −1, 1, −1, 1, −1, 1, −1, 1, −1, 1, −1}.

5. A communication apparatus, comprising:
a receiver, configured to receive a downlink control information (DCI) from a network device, wherein the DCI is used to indicate a first resource, and the first resource is a time-frequency resource used to transmit a narrowband physical uplink shared channel (NPUSCH) format 2 transmission, and wherein the NPUSCH format 2 transmission is used to carry downlink hybrid automatic repeat request-acknowledgment (HARQ-ACK) feedback information;
a processor, configured to determine a first transmission sequence based on the HARQ-ACK feedback information and a preset orthogonal sequence, wherein the first transmission sequence is a sequence of complex symbols, wherein the sequence of complex symbols is obtained by multiplying a modulation symbol with each element in the preset orthogonal sequence, wherein the modulation symbol is determined based on the HARQ-ACK feedback information, wherein the preset orthogonal sequence is a first orthogonal sequence or a second orthogonal sequence different from the first orthogonal sequence, wherein the first orthogonal sequence is used when there is no scheduling request to be transmitted, and wherein the second orthogonal sequence is used when there is a scheduling request to be transmitted; and
a transmitter, configured to send the first transmission sequence on the first resource, wherein the first transmission sequence is used to carry both the HARQ-ACK feedback information and scheduling request information.

6. The apparatus according to claim 5, wherein:
the first orthogonal sequence is {1, 1, 1, 1, 1, 1, 1, 1, 1, 1, 1, 1, 1, 1, 1, 1}; or
the second orthogonal sequence is {1, −1, 1, −1, 1, −1, 1, −1, 1, −1, 1, −1, 1, −1, 1, −1}.

7. A communication apparatus, comprising:
a transmitter, configured to send a downlink control information (DCI) to a terminal device, wherein the DCI is used to indicate a first resource, the first resource is a time-frequency resource used to transmit a narrowband physical uplink shared channel (NPUSCH) format 2 transmission, and the NPUSCH format 2 transmission is used to carry downlink hybrid automatic repeat request acknowledgement (HARQ-ACK) feedback information; and
a receiver, configured to receive, on the first resource, a first transmission sequence from the terminal device, wherein the first transmission sequence is determined by the terminal device based on the HARQ-ACK feedback information and a preset orthogonal sequence, and wherein the first transmission sequence is used to carry both the HARQ-ACK feedback information and scheduling request information, wherein the first transmission sequence is a sequence of complex symbols, wherein the sequence of complex symbols is obtained by multiplying a modulation symbol with each element in the preset orthogonal sequence, wherein the modulation symbol is determined based on the HARQ-ACK feedback information, wherein the preset orthogonal sequence is a first orthogonal sequence or a second orthogonal sequence different from the first orthogonal sequence, wherein the first orthogonal sequence is used when there is no scheduling request to be transmitted, and wherein the second orthogonal sequence is used when there is a scheduling request to be transmitted.

8. The apparatus according to claim 7, wherein the second orthogonal sequence is {1, −1, 1, −1, 1, −1, 1, −1, 1, −1, 1, −1, 1, −1, 1, −1}.

* * * * *